(12) United States Patent
Nakao et al.

(10) Patent No.: US 8,620,338 B2
(45) Date of Patent: Dec. 31, 2013

(54) RADIO TERMINAL, RADIO BASE STATION, CHANNEL SIGNAL FORMING METHOD AND CHANNEL SIGNAL RECEIVING METHOD

(75) Inventors: Seigo Nakao, Kanagawa (JP); Daichi Imamura, Kanagawa (JP); Takahisa Aoyama, Kanagawa (JP)

(73) Assignee: Panasonic Corporation, Osaka (JP)

( * ) Notice: Subject to any disclaimer, the term of this patent is extended or adjusted under 35 U.S.C. 154(b) by 203 days.

(21) Appl. No.: 13/130,273

(22) PCT Filed: Nov. 30, 2009

(86) PCT No.: PCT/JP2009/006482
§ 371 (c)(1),
(2), (4) Date: May 19, 2011

(87) PCT Pub. No.: WO2010/064398
PCT Pub. Date: Jun. 10, 2010

(65) Prior Publication Data
US 2011/0223926 A1  Sep. 15, 2011

(30) Foreign Application Priority Data

Dec. 1, 2008 (JP) ................................ 2008-306742
Mar. 27, 2009 (JP) ................................ 2009-079674

(51) Int. Cl.
| | | |
|---|---|---|
| H04W 72/00 | (2009.01) | |
| H04W 4/00 | (2009.01) | |
| H04B 1/00 | (2006.01) | |
| H04B 7/00 | (2006.01) | |
| H04B 1/44 | (2006.01) | |
| H04J 3/00 | (2006.01) | |
| H04L 12/66 | (2006.01) | |

(52) U.S. Cl.
USPC .......... 455/450; 455/63.1; 455/428; 455/511; 455/515; 455/516; 370/282; 370/329; 370/345; 370/352

(58) Field of Classification Search
USPC ......... 455/41.1, 68, 70, 423, 456.3, 450, 509, 455/515, 435.1, 561, 455, 464, 511, 455/516–517, 526, 422.1; 375/140, 143, 375/260, 296, 341; 370/277–278, 280, 281, 370/282, 328–330, 341, 345, 438, 311, 335, 370/336
See application file for complete search history.

(56) References Cited

U.S. PATENT DOCUMENTS 8,155,594 B2 * 4/2012 Brisebois et al. ............ 455/63.1
(Continued)

OTHER PUBLICATIONS

3GPP TSG-RAN WG1 #52bis, "Remaining issues on PDCCH formats and contents," Qualcomm Europe, R1-081479, Mar. 31-Apr. 4, 2008, pp. 1-5.
(Continued)

Primary Examiner — Inder Mehra
(74) Attorney, Agent, or Firm — Seed IP Law Group PLLC

(57) ABSTRACT

A radio terminal, radio base station, channel signal forming method and channel signal receiving method wherein when an upstream unit band and a plurality of downstream unit bands associated therewith are used to perform communications, the quality of downstream assignment control information can be prevented from being degraded. In a base station (100), the PDCCH signals including upstream assignment control information are limited to ones that are placed in some of the downstream unit bands. This can reduce the probability of performance of zero padding to downstream assignment control information having greater importance. Also in the base station (100), the PDCCH signals of the downstream unit bands other than the basic unit band include only downstream resource assignment information. For this reason, in the individual regions of the downstream unit bands other than the basic unit band, the bandwidth of the downstream unit bands is always used as a reference of size adjustment and hence requires no information size adjustment. As a result, there is no need of performing zero padding to the downstream assignment control information, so that the quality of downstream assignment control information can be prevented from being degraded.

15 Claims, 11 Drawing Sheets

(56) References Cited

U.S. PATENT DOCUMENTS

| | | | |
|---|---|---|---|
| 2004/0114574 A1* | 6/2004 | Zeira et al. | 370/352 |
| 2006/0274712 A1* | 12/2006 | Malladi et al. | 370/345 |
| 2009/0088148 A1* | 4/2009 | Chung et al. | 455/423 |
| 2010/0120424 A1* | 5/2010 | Johansson et al. | 455/435.1 |
| 2010/0120442 A1* | 5/2010 | Zhuang et al. | 455/450 |
| 2010/0130137 A1* | 5/2010 | Pelletier et al. | 455/68 |
| 2011/0096658 A1* | 4/2011 | Yang et al. | 370/210 |
| 2011/0222629 A1* | 9/2011 | Lindh et al. | 375/296 |

OTHER PUBLICATIONS

3GPP TSG-RAN WG1 Meeting #53, "PDCCH contents and formats," Panasonic, R1-081792, May 5-9, 2008, pp. 1-4.

3GPP TS 36.211 V8.4.0, "3rd Generation Partnership Project; Technical Specification Group Radio Access Network; Evolved Universal Terrestrial Radio Access (E-UTRA); Physical Channels and Modulation (Release 8)," Sep. 2008, pp. 1-78, p. 7, Line 4.

3GPP TS 36.212 V8.4.0, "3rd Generation Partnership Project; Technical Specification Group Radio Access Network; Evolved Universal Terrestrial Radio Access (E-UTRA); Multiplexing and channel coding (Release 8)," Sep. 2008, pp. 1-56, p. 7, Line 7.

3GPP TS 36.213 V8.4.0, "3rd Generation Partnership Project; Technical Specification Group Radio Access Network; Evolved Universal Terrestrial Radio Access (E-UTRA); Physical layer procedures (Release 8)," Sep. 2008, pp. 1-60, p. 7, Line 10.

3GPP TSG-RAN WG1 #54bis, "Carrier aggregation," Ericsson, R1-083750, Sep. 29-Oct. 3, 2008, pp. 1-4.

3GPP TSG RAN WG1 Meeting #56, "PHICH Linkage for asymmetric carrier aggregation," Panasonic, R1-090683, Feb. 9-13, 2009, pp. 1-3.

3GPP TSG RAN WG1 #56, "Notion of Anchor Carrier in LTE-A," Qualcomm Europe, R1-090860, Feb. 9-13, 2009, pp. 1-5.

\* cited by examiner

| BAND TO TRANSMIT UL GRANT | | SIZE IN UE SPECIFIC SS | SIZE IN COMMON SS |
|---|---|---|---|
| UE A | BAND A | ○ | 20MHz | 20MHz |
| | BAND B | × | (LARGER ONE OF INFORMATION SIZE OF DOWNLINK ASSIGNMENT CONTROL INFORMATION DETERMINED FROM BANDWIDTH OF BAND A AND INFORMATION SIZE OF UPLINK ASSIGNMENT CONTROL INFORMATION DETERMINED FROM UL BANDWIDTH) | (LARGER ONE OF INFORMATION SIZE OF DOWNLINK ASSIGNMENT CONTROL INFORMATION DETERMINED FROM BANDWIDTH OF BAND A AND INFORMATION SIZE OF UPLINK ASSIGNMENT CONTROL INFORMATION DETERMINED FROM UL BANDWIDTH) |
| UE B | BAND A | × | 10MHz | 15MHz |
| | BAND B | ○ | INFORMATION SIZE OF DOWNLINK ASSIGNMENT CONTROL INFORMATION DETERMINED FROM BANDWIDTH OF BAND B) | (LARGER ONE OF INFORMATION SIZE OF DOWNLINK ASSIGNMENT CONTROL INFORMATION DETERMINED FROM BANDWIDTH OF BAND B AND INFORMATION SIZE OF UPLINK ASSIGNMENT CONTROL INFORMATION DETERMINED FROM UL BANDWIDTH) |
| | BAND A | ○ | 20MHz | 20MHz |
| | BAND B | ○ | INFORMATION SIZE OF DOWNLINK ASSIGNMENT CONTROL INFORMATION DETERMINED FROM BANDWIDTH OF BAND A) | (LARGER ONE OF INFORMATION SIZE OF DOWNLINK ASSIGNMENT CONTROL INFORMATION DETERMINED FROM BANDWIDTH OF BAND A AND INFORMATION SIZE OF UPLINK ASSIGNMENT CONTROL INFORMATION DETERMINED FROM UL BANDWIDTH) |
| UE C | | | 15MHz | 15MHz |
| | BAND A | ○ | 20MHz | 20MHz |
| | | | (LARGER ONE OF INFORMATION SIZE OF DOWNLINK ASSIGNMENT CONTROL INFORMATION DETERMINED FROM BANDWIDTH OF BAND B AND INFORMATION SIZE OF UPLINK ASSIGNMENT CONTROL INFORMATION DETERMINED FROM UL BANDWIDTH) | (LARGER ONE OF INFORMATION SIZE OF DOWNLINK ASSIGNMENT CONTROL INFORMATION DETERMINED FROM BANDWIDTH OF BAND B AND INFORMATION SIZE OF UPLINK ASSIGNMENT CONTROL INFORMATION DETERMINED FROM UL BANDWIDTH) |
| | BAND B | ○ | 15MHz | 15MHz |

FIG.6

| | BAND TO TRANSMIT UL GRANT | SIZE IN UE SPECIFIC SS | SIZE IN COMMON SS |
|---|---|---|---|
| UE A | BAND A ○ | 20MHz (LARGER ONE OF INFORMATION SIZE OF DOWNLINK ASSIGNMENT CONTROL INFORMATION DETERMINED FROM BANDWIDTH OF BAND A AND INFORMATION SIZE OF UPLINK ASSIGNMENT CONTROL INFORMATION DETERMINED FROM UL BANDWIDTH) | 20MHz (LARGER ONE OF INFORMATION SIZE OF DOWNLINK ASSIGNMENT CONTROL INFORMATION DETERMINED FROM BANDWIDTH OF BAND A AND INFORMATION SIZE OF UPLINK ASSIGNMENT CONTROL INFORMATION DETERMINED FROM UL BANDWIDTH) |
| | BAND B × | 10MHz (INFORMATION SIZE OF DOWNLINK ASSIGNMENT CONTROL INFORMATION DETERMINED FROM BANDWIDTH OF BAND B) | 20MHz (LARGER ONE OF INFORMATION SIZE OF DOWNLINK ASSIGNMENT CONTROL INFORMATION DETERMINED FROM BANDWIDTH OF BAND B AND INFORMATION SIZE OF UPLINK ASSIGNMENT CONTROL INFORMATION DETERMINED FROM UL BANDWIDTH) |
| UE B | BAND A × | 15MHz (INFORMATION SIZE OF DOWNLINK ASSIGNMENT CONTROL INFORMATION DETERMINED FROM BANDWIDTH OF BAND A) | 20MHz (LARGER ONE OF INFORMATION SIZE OF DOWNLINK ASSIGNMENT CONTROL INFORMATION DETERMINED FROM BANDWIDTH OF BAND A AND INFORMATION SIZE OF UPLINK ASSIGNMENT CONTROL INFORMATION DETERMINED FROM UL BANDWIDTH) |
| | BAND B ○ | 20MHz (LARGER ONE OF INFORMATION SIZE OF DOWNLINK ASSIGNMENT CONTROL INFORMATION DETERMINED FROM BANDWIDTH OF BAND B AND INFORMATION SIZE OF UPLINK ASSIGNMENT CONTROL INFORMATION DETERMINED FROM UL BANDWIDTH) | 20MHz (LARGER ONE OF INFORMATION SIZE OF DOWNLINK ASSIGNMENT CONTROL INFORMATION DETERMINED FROM BANDWIDTH OF BAND B AND INFORMATION SIZE OF UPLINK ASSIGNMENT CONTROL INFORMATION DETERMINED FROM UL BANDWIDTH) |
| UE C | BAND A ○ | 20MHz (LARGER ONE OF INFORMATION SIZE OF DOWNLINK ASSIGNMENT CONTROL INFORMATION DETERMINED FROM BANDWIDTH OF BAND A AND INFORMATION SIZE OF UPLINK ASSIGNMENT CONTROL INFORMATION DETERMINED FROM UL BANDWIDTH) | 20MHz (LARGER ONE OF INFORMATION SIZE OF DOWNLINK ASSIGNMENT CONTROL INFORMATION DETERMINED FROM BANDWIDTH OF BAND A AND INFORMATION SIZE OF UPLINK ASSIGNMENT CONTROL INFORMATION DETERMINED FROM UL BANDWIDTH) |
| | BAND B ○ | 20MHz (LARGER ONE OF INFORMATION SIZE OF DOWNLINK ASSIGNMENT CONTROL INFORMATION DETERMINED FROM BANDWIDTH OF BAND B AND INFORMATION SIZE OF UPLINK ASSIGNMENT CONTROL INFORMATION DETERMINED FROM UL BANDWIDTH) | 20MHz (LARGER ONE OF INFORMATION SIZE OF DOWNLINK ASSIGNMENT CONTROL INFORMATION DETERMINED FROM BANDWIDTH OF BAND B AND INFORMATION SIZE OF UPLINK ASSIGNMENT CONTROL INFORMATION DETERMINED FROM UL BANDWIDTH) |

FIG.8

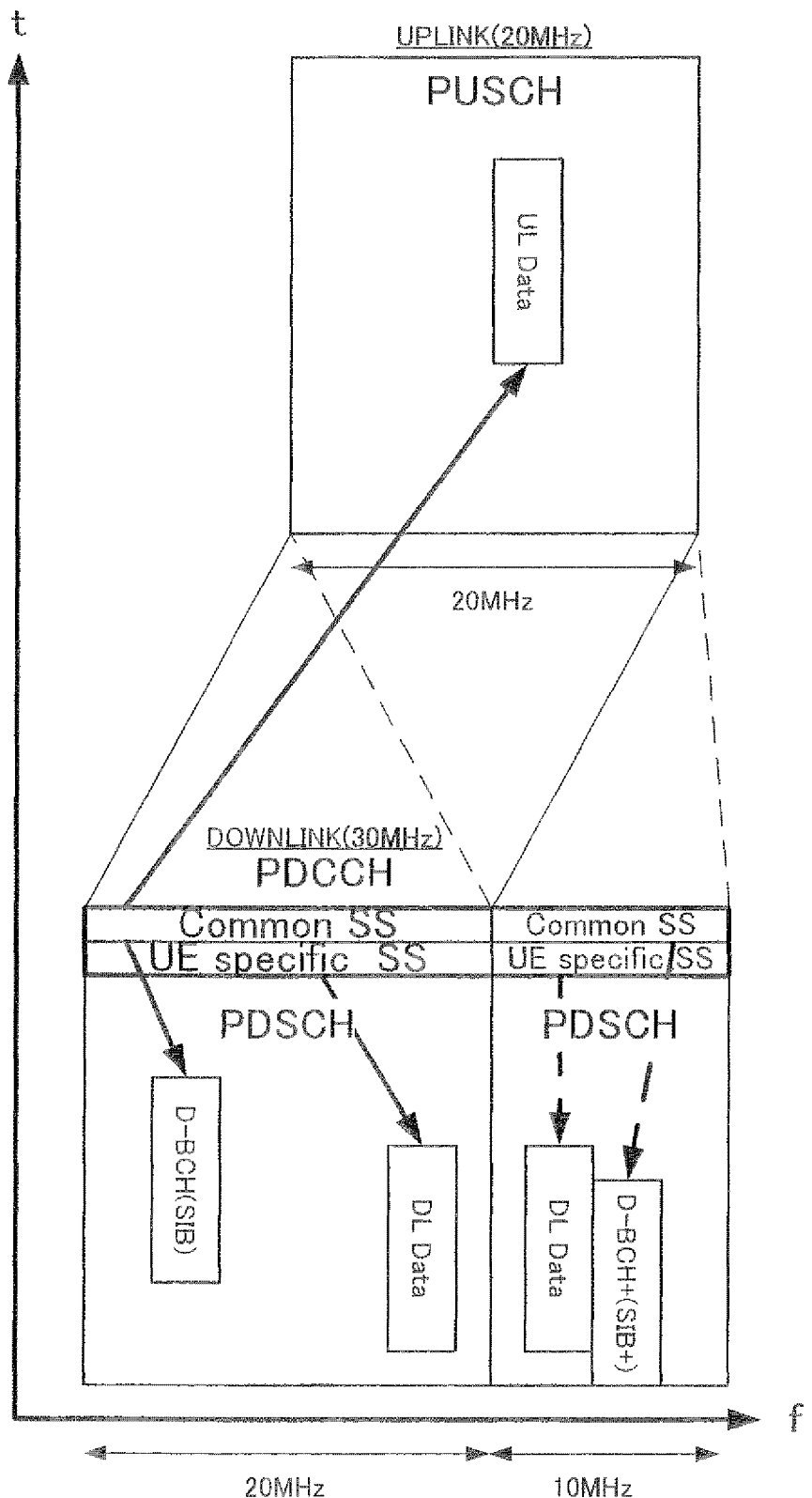

RADIO TERMINAL, RADIO BASE STATION, CHANNEL SIGNAL FORMING METHOD AND CHANNEL SIGNAL RECEIVING METHOD

TECHNICAL FIELD

The present invention relates to a radio terminal, radio base station, channel signal forming method and channel signal receiving method.

BACKGROUND ART

In 3GPP LTE, OFDMA (Orthogonal Frequency Division Multiple Access) is employed as a downlink communication method. In a radio communication system adopting 3GPP LTE, a base station transmits a synchronizing signal (synchronization channel: SCH) and a broadcast signal (broadcast channel: BCH) using prescribed communication resources. A terminal first synchronizes with a base station by capturing the SCH. Then, the terminal acquires parameters that are specific to that base station (for example, the frequency bandwidth) by reading BCH information (see Non-patent Literature 1, 2 and 3).

Also, after the terminal acquires base station-specific parameters, the terminal sends a connection request to the base station, and, by this means, establishes communication with the base station. When necessary, the base station transmits control information to the terminal, with which communication has been established, using a PDCCH (Physical Downlink Control CHannel).

The terminal performs "blind detection" for the received PDCCH signal. That is, a PDCCH signal includes a CRC (Cyclic Redundancy Check) part, and, at a base station, this CRC part is masked by the terminal ID of the target terminal. Thus, until a terminal demasks the CRC part of a received PDCCH signal with the terminal's terminal ID, the terminal cannot decide whether or not the PDCCH signal is for that terminal. In this blind detection, if the result of demasking is that CRC calculation is OK, the PDCCH signal is decided to be sent for the terminal.

Also, control information sent by a base station includes assignment control information including, for example, information about resources which a base station allocates to a terminal. A terminal needs to receive both downlink assignment control information and uplink assignment control information which have a plurality of formats. Although downlink assignment control information which a terminal should receive can be defined in a plurality of sizes depending on the transmitting antenna control method and frequency allocation method at a base station, some of these downlink assignment control information formats (hereinafter simply referred to as "downlink assignment control information") and uplink assignment control information formats (hereinafter simply referred to as "uplink assignment control information") are transmitted using PDCCH signals of the same size. A PDCCH signal includes type information of assignment control information (for example, a 1 bit flag). Thus, even if the size of a PDCCH signal including downlink assignment control information and the size of a PDCCH signal including uplink assignment control information are the same, a terminal checks type information of assignment control information, and by this means can distinguish between downlink assignment control information and uplink assignment control information. The PDCCH format to transmit uplink assignment control information is PDCCH format 0, and the PDCCH format to transmit downlink assignment control information, transmitted in a PDCCH signal of the same size as for uplink assignment control information, is PDCCH format 1A.

However, cases might occur where the information size of uplink assignment control information determined from the uplink bandwidth (that is, the number of bits required for transmission) and the information size of downlink assignment control information determined from the downlink bandwidth differ. To be more specific, if an uplink bandwidth is small, the information size of uplink assignment control information becomes small, and, if a downlink bandwidth is small, the information size of downlink assignment control information becomes small. If a difference in bandwidth results in a difference in the information size like this, by adding zero information to the smaller assignment control information (that is, by performing zero-padding), the size of downlink assignment control information and the size of uplink assignment control information are made equal. By this means, whether the content is downlink assignment control information or uplink assignment control information, PDCCH signals have the same size.

The size adjustment of control information as mentioned above reduces the number of times of blind detection at a terminal on the receiving side. However, when a downlink transmission bandwidth of a base station is wide, a base station transmits many PDCCH signals at once, so that a terminal cannot reduce the number of times of blind detection much in its normal operation, and the increase of circuit scale causes a problem.

Therefore, to reduce the number of times of blind detection on a terminal more, a terminal employs the method to limit a physical region where a terminal receives control information. Thus, each terminal is reported in advance the time and frequency region that may include control information for that terminal, and performs blind detection only in a terminal-specific region where control information for that terminal is likely to be included. This terminal-specific physical region is called "dedicated region (UE SS: UE specific Search Space)." This dedicated region is associated with for example, terminal ID. Also, a time and frequency interleaving is employed to keep the effect of time diversity and frequency diversity at a certain level in the whole dedicated region.

On the other hand, a PDCCH signal includes control information that is reported at once to a plurality of terminals (for example, scheduling information about downlink broadcast signal). To transmit this control information, a physical region that is common to all terminals, called "common region (Common SS: Common Search Space)," is prepared in a PDCCH signal.

A terminal requires both control information included in a dedicated region and control information included in a common region, so that a terminal needs to perform blind detection for all of uplink control information and downlink control information included in a dedicated region and uplink control information and downlink control information included in a common region.

Also, the standardization of 3GPP LTE-advanced has been started to realize much faster communication than 3GPP LTE. 3GPP LTE-advanced system (hereinafter referred to as "LTE-A system") adheres 3GPP LTE system (hereinafter referred to as "LTE system"). In 3GPP LTE-advanced, to realize a downlink transmission speed up to maximum 1 Gbps, a base station and a terminal which can communicate in wideband frequency of 20 MHz or more are expected to be introduced.

Also, in 3GPP LTE-Advanced, throughput requirements for an uplink and a downlink are different, so that communication bandwidths for an uplink and a downlink may be made asymmetric. Specifically, in 3GPP LTE-Advanced, it is considered to make the communication bandwidth of a downlink wider than the communication bandwidth of an uplink.

Here, a base station to support LTE-A system (hereinafter referred to as "LTE-A base station") is formed to be able to communicate using a plurality of "component bands." "Component band" is a bandwidth for maximum 20 MHz here and is defined as the basic unit of communication band. Furthermore, "component band" in a downlink (hereinafter referred to as "downlink component band") is defined as a band separated by downlink frequency bandwidth information in BCH broadcasted from a base station, or a band defined by the range of distribution when a downlink control channel (PDCCH) is arranged in a distributed manner. Also, "component band" in an uplink (hereinafter referred to as "uplink component band") is defined as a band separated by uplink frequency bandwidth information in BCH broadcasted from a base station, or the basic unit of a communication band of 20 MHz or less including a PUSCH (Physical Uplink Shared CHannel) near the center, and a PUCCH (Physical Uplink Control CHannel) for an LTE on both ends. Also, in 3GPP LTE-Advanced, "component band" may be designated as "Component Carrier (s)" in English.

FIG. 1 is a diagram showing an arrangement example of each channel in an LTE-A system where the communication bandwidth and the numbers of component bands of an uplink and a downlink are asymmetric. In FIG. 1, to let a terminal transmit an uplink signal, an LTE-A base station reports assignment control information using PDCCH from both two downlink component bands. Since an uplink component band is associated with both downlink component bands, regardless of the PDCCH whichever downlink component band is used, the PUSCH is transmitted in the same uplink band. Also, downlink assignment control information may be transmitted from both two downlink component bands, and is used to indicate downlink assignment control information in a downlink component band where each piece of downlink resource assignment information was transmitted, to a terminal.

By receiving assignment control information in this way, an LTE-A terminal can receive a plurality of component bands at the same time. However, an LTE terminal can receive only one component band at once. To group a plurality of component bands as an allocation band for single communication is called "carrier aggregation (Carrier aggregation)." This carrier aggregation can improve throughput.

CITATION LIST

Non Patent Literature

NPL 1
3GPP TS 36.211 V8.4.0, "Physical Channels and Modulation (Release 8)," September 2008
NPL 2
3GPP TS 36.212 V8.4.0, "Multiplexing and channel coding (Release 8)," September 2008
NPL 3
3GPP TS 36.213 V8.4.0, "Physical layer procedures (Release 8)," September 2008

SUMMARY OF INVENTION

Technical Problem

Meanwhile, in FIG. 1, the communication bandwidth of an LTE-A system is 30 MHz in the downlink, and includes 20 MHz downlink component band in a low frequency side and 10 MHz downlink component band in a high frequency side. On the other hand, an uplink is 20 MHz and includes one uplink component band.

In FIG. 1, the bandwidths of a downlink component band and an uplink component band in low frequency side are equal, so that, as for this pair, the information size of uplink assignment control information and downlink assignment control information is nearly the same. Thus, zero-padding is rarely performed. By contrast with this, since the bandwidths of a downlink component band and an uplink component band in high frequency side become larger, as for this pair, much zero information is added to the smaller downlink assignment control information until this downlink assignment control information size becomes equal to the uplink assignment control information size. However, zero-padding is performed for size adjustment, and zero information itself carries no meaning. Thus, downlink assignment control information includes fundamentally unnecessary signal, so that if overall power is fixed, power per information bit fundamentally necessary declines.

Also, generally, downlink assignment control information is more significant than uplink assignment control information That is, downlink assignment control information is used to report not only resource assignment information of a downlink data channel, but also scheduling information of other important information, such as paging information and broadcast information. Thus, it is preferable a frequency of zero-padding to downlink assignment control information to decrease.

Here, frequency diversity effect that a PDCCH can achieve depends on the bandwidth of a downlink component band. Thus, since in the downlink component band of a narrow bandwidth frequency diversity effect becomes smaller, a cause that will reduce quality should be removed as much as possible. However, as for zero-padding, the narrower the bandwidth of a downlink component band is, the higher the possibility zero-padding is performed.

This kind of situation cannot occur in an LTE system where no carrier aggregation concept exists since generally a downlink frequency bandwidth is larger than an uplink frequency bandwidth associated with the downlink frequency bandwidth. On the other hand, in an LTE-A system, where carrier aggregation is introduced and where furthermore a plurality of downlink component bands are associated with one uplink component band, although a downlink frequency bandwidth is larger than an uplink frequency bandwidth on the whole, as for the component band, the situation where a downlink component band is narrower than an uplink component band may occur frequently.

Also, to avoid zero-padding, a method of making the information sizes of uplink assignment control information and downlink assignment control information different is also possible. However, in this case, a terminal has to perform blind detection separately for two pieces of assignment control information having different numbers of information bits. Thus, the number of times of blind detection increases, and, accompanying this, the increase of circuit scale becomes a problem.

In view of the above, it is an object of the present invention to provide a radio terminal, radio base station, channel signal for forming method and channel signal receiving method, when communicating with an uplink component band and a plurality of downlink component bands associated with the uplink component band, by reducing the frequency to perform size adjustment processing for downlink assignment control information to prevent the quality of downlink assignment control information from being degrading.

Solution of Problem

A radio base station according to the present invention is a radio base station that allocates component band groups on a per radio terminal basis and that is able to communicate with radio terminals using a component band groups, each component band group being formed with an uplink component band and a plurality of downlink component bands associated with the uplink component band, and that employs a configuration having: a forming section that forms channel signals on a per downlink component band basis, each channel signal having a common region that is common between all radio terminals and a dedicated region that is allocated to an individual radio terminal on a dedicated basis, downlink assignment control information for an arbitrary target terminal being included in the common region and in the dedicated region, in all channel signals to be transmitted in a downlink component band allocated to the arbitrary target terminal, uplink assignment control information for the arbitrary target terminal being included in the dedicated region only in part of the channel signals, and included in the common region at least in the part of the channel signals; and, an information size adjustment section that adjusts an information size of uplink control information and downlink control information for the arbitrary target terminal, included in the formed channel signals, based on a size adjustment reference, in all downlink component bands that are allocated to the arbitrary target terminal, in the common region, a larger one of a downlink assignment control information size determined from a bandwidth of a downlink component band in which a channel signal having the common region is sent, and an uplink assignment control information size determined from a bandwidth of an uplink component band associated with the downlink component band, being used as a size adjustment reference, in a dedicate region including uplink assignment control information for the arbitrary target terminal, the larger one of the downlink assignment control information size determined from the bandwidth of the downlink component band in which the channel signal having the dedicated region is sent, and the uplink assignment control information size determined from the bandwidth of the uplink component band associated with the downlink component band, being used as the size adjustment reference, in a dedicate region not including uplink assignment control information for the arbitrary target terminal, the downlink assignment control information size determined from the bandwidth of the downlink component band in which the channel signal having the dedicated region is sent, being used as the size adjustment reference.

A radio terminal according to the present invention is a radio terminal that is able to communicate with a radio base station using a component band group that is allocated by the radio base station and that is formed with an uplink component band and a plurality of downlink component bands associated with the uplink component band, and that includes a radio receiving section that receives channel signals on a per downlink component band basis, each channel signal having a common region that is common between all radio terminals and a dedicated region that is allocated to an individual radio terminal on a dedicated basis, and including uplink assignment control information and downlink assignment control information; a determining section that determines a basic information size to use in a receiving process of channel signals of each downlink component band; and a channel signal receiving process section that performs the receiving process of the channel signals based on the basic information size, where in all downlink component bands that are allocated to the radio terminal, in the common region, the determining section determines the basic information size based on the larger one of a downlink assignment control information size determined from a bandwidth of a downlink component band in which a channel signal having the common region is sent, and an uplink assignment control information size determined from a bandwidth of an uplink component band associated with the downlink component band; in a dedicate region including uplink assignment control information for the radio terminal, the determining section determines the basic information size based on the larger one of the downlink assignment control information size determined from the bandwidth of the downlink component band in which a channel signal having the dedicated region is sent, and the uplink assignment control information size determined from the bandwidth of the uplink component band associated with the downlink component band; and in a dedicate region not including uplink assignment control information for the radio terminal, the determining section determines the basic information size based on the downlink assignment control information size determined from the bandwidth of the downlink component band in which the channel signal having the dedicated region is sent.

A channel signal forming method according to the present invention is a channel signal forming method that forms channel signals for a plurality of downlink component bands associated with an uplink component band, and that includes the steps of: forming channel signals on a per downlink component band basis, each channel signal having a common region that is common between all radio terminals and a dedicated region that is allocated to an individual radio terminal on a dedicated basis; and adjusting the information size of uplink assignment control information and downlink assignment control information included in the formed channel signals, based on a size adjustment reference, where downlink assignment control information the arbitrary target terminal being included in the common region and the dedicated region in all channel signal to be transmitted in the downlink component band allocated to the arbitrary target terminal, uplink assignment control information for the arbitrary target terminal being included in the dedicated region only in part of the channel signals, and included in the common region at least in the part of the channel signals; and in all downlink component bands that are allocated to the arbitrary target terminal, in the common region, the larger one of the information size of downlink assignment control information determined from the bandwidth of the downlink component band in which the channel signal having the common region is sent, and the information size of uplink assignment control information determined from the bandwidth of the uplink component band associated with the downlink component band, being used as the size adjustment reference, in the dedicate region including the uplink assignment control information for the arbitrary target terminal, the larger one of the information size of downlink assignment control information determined from the bandwidth of the downlink component band in which the channel signal having the dedicated region is sent, and the information size of uplink assignment control information determined from the bandwidth of the uplink component band associated with the downlink component band, being used as the size adjustment reference, in the dedicate region not including the uplink assignment control information to the arbitrary target terminal, the information size of downlink assignment control information determined from the bandwidth of the downlink component band in which the channel signal having the dedicated region is sent, being used as the size adjustment reference.

A channel signal receiving method according to the present invention is a channel signal receiving method that receives channel signals for a plurality of downlink component bands associated with an uplink component band, and that includes the steps of: receiving channel signals having a common region that is common between all radio terminals and a dedicated region that is allocated to an individual radio terminals on a dedicated basis, and including uplink assignment control information and downlink assignment control information; determining the basic information size to use in a receiving process of the channel signals of each downlink component band; and performing a receiving process of the channel signals based on the basic information size, where in all downlink component bands that are allocated to the radio terminal, in the common region, the basic information size is determined based on the larger one of an information size of a downlink assignment control information determined from a bandwidth of a downlink component band in which the channel signal having the common region is sent, and an information size of uplink assignment control information determined from a bandwidth of an uplink component band associated with the downlink component band, in the dedicate region including the uplink assignment control information for the radio terminal, the basic information size is determined based on the larger one of the information size of downlink assignment control information determined from the bandwidth of the downlink component band in which the channel signal having the dedicated region is sent, and the information size of uplink assignment control information determined from the bandwidth of the uplink component band associated with the downlink component band; and in the dedicate region not including uplink assignment control information for the radio terminal, the basic information size is determined based on the information size of downlink assignment control information determined from the bandwidth of the downlink component band in which the channel signal having the dedicated region is sent.

Advantageous Effects of Invention

The present invention provides radio terminal, radio base station, channel signal forming method, and channel signal receiving method to prevent the quality of downlink assignment control information from degrading.

BRIEF DESCRIPTION OF THE DRAWINGS

FIG. 6 shows the method of determining size adjustment reference of downlink assignment control information;

FIG. 8 shows the method of determining size adjustment reference of downlink assignment control information;

FIG. 11 shows operations of a base station and a terminal.

DESCRIPTION OF EMBODIMENTS

Figure 1:
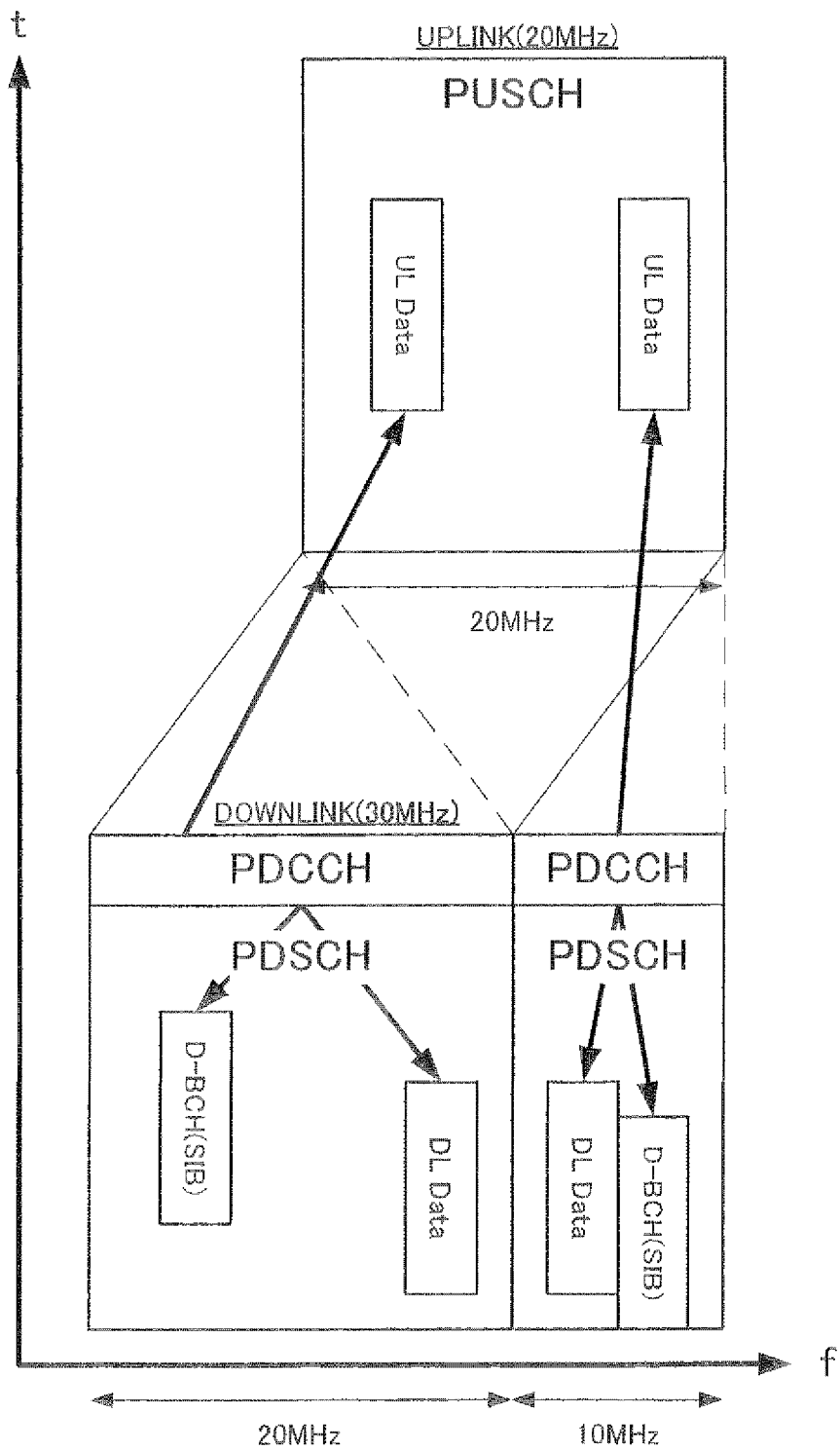
FIG. 1 shows an arrangement example of each channel in an LTE-A system where the communication bandwidth (the number of component bands) is asymmetric between an uplink and a downlink.

Now, embodiments of the present invention will be explained in detail with reference to the accompanying drawings. Here, in embodiments, the same components will be assigned the same reference numerals and their explanations will be omitted.

Embodiment 1

Figure 2:
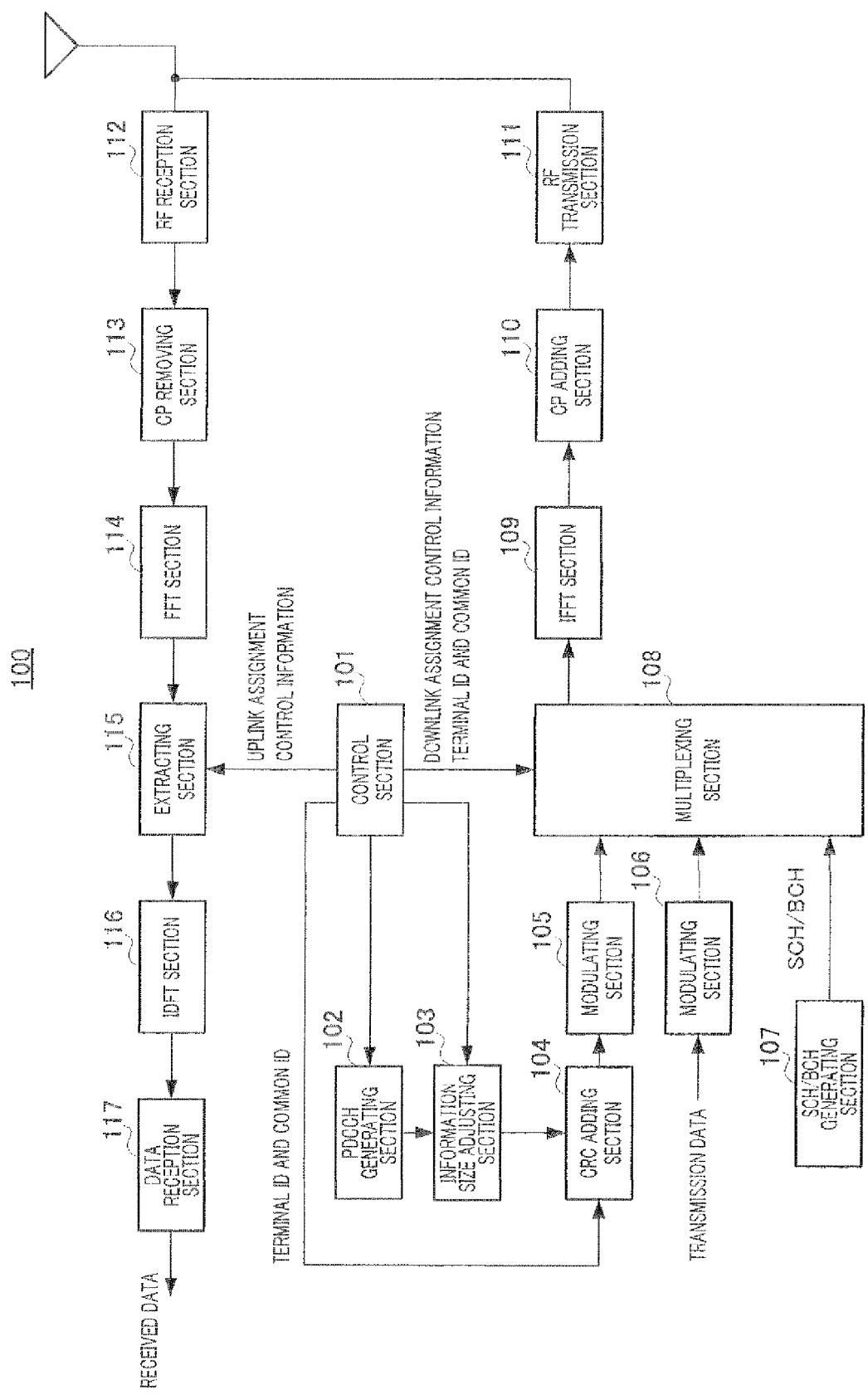
FIG. 2 is a block diagram showing a configuration of a base station according to Embodiment 1 of the present invention.

FIG. 2 is a block diagram showing a configuration of base station 100 according to Embodiment 1 of the present invention. In FIG. 2, base station 100 includes control section 101, PDCCH generating section 102, information size adjusting section 103, CRC (Cyclic Redundancy Check) adding section 104, modulating section 105 and 106, SCH/BCH generating section 107, multiplexing section 108, IFFT section 109, CP adding section 110, RF transmission section 111, RF reception section 112, CP removing section 113, FFT section 114, extracting section 115, IDFT section 116, and data reception section 117. Base station 100 is configured to be able to communicate with terminal 200 (described later) using a component band group composed of an uplink component band and a plurality of downlink component bands associated with the uplink component band. A component band group is set for each terminal 200. Some or all of a plurality of component bands composing the component band group allocated to first terminal 200 may overlap with a constituent component band of the component band group allocated to second terminal 200.

Control section 101 generates control information (including uplink assignment control information and downlink assignment control information) and region assignment information indicating to which one of a dedicated region or a common region each piece of control information is allocated. This control information includes component band group setting information individually set for each terminal 200, "basic component band information (Anchor Carrier)" (described later), dedicated assignment control information, such as resource assignment information in component bands composing a component band group, and common assignment control information which is common to all terminals 200. While dedicated region assignment control information is generated for control information to be allocated to each terminal 200 on a dedicated basis, common region assignment information is generated for common control information that is common for all terminals 200.

Also, while downlink assignment control information for given terminal 200 is allocated to all of a plurality of downlink component bands composing the component band group set for that terminal 200, control section 101 allocates uplink assignment control information for that terminal 200 only to part of the plurality of downlink component bands. The allocation target downlink component band where uplink assignment control information is allocated is "basic component band," and information related to this basic component band is the above mentioned "basic component band information." This basic component band information is reported to a given terminal in advance. If this basic component band information is common between given terminals 200, information may be included in BCH in SCH/BCH generating section 107 and broadcast.

To information size adjusting section 103, control section 101 outputs information size comparing information showing the difference in size between the information size of downlink assignment control information determined from the bandwidth of the basic component band and the information size of uplink assignment control information determined from the bandwidth of the uplink component band associated with the downlink component band.

PDCCH generating section 102 receives control information and region assignment information generated in control section 101, and generates a PDCCH signal to be sent in each downlink component band, based on these control information and region assignment information.

Specifically, PDCCH generating section 102 generates a PDCCH signal as follows. While including both uplink assignment control information and downlink assignment control information in a PDCCH signal to be placed in a downlink component band indicated in basic component band information, PDCCH generating section 102 only includes downlink assignment control information in other downlink component bands. This process of sorting uplink assignment control information and downlink assignment control information is performed based on basic component band information. Also, while mapping common assignment control information to a common region of a PDCCH signal, PDCCH generating section 102 maps dedicated assignment control information to a dedicated region. This process of sorting common assignment control information and dedicated assignment control information is performed based on region assignment information.

Information size adjusting section 103 receives control information and region assignment information generated in control section 101. Based on these control information and region assignment information, information size adjusting section 103 adjusts the information size of uplink assignment control information and downlink assignment control information included in a PDCCH signal received from PDCCH generating section 102.

Specifically, based on basic component band information, information size adjusting section 103 determines whether a PDCCH signal subject to information size adjustment is to be transmitted in the basic component band or in a different downlink component band.

In a common region of the first PDCCH signal (that is a PDCCH signal which does not include uplink assignment information) which is sent in a downlink component band other than the basic component band, information size adjusting section 103 uses the larger one of the information size of downlink assignment control information determined from the bandwidth of the target downlink component band in which the first PDCCH signal is sent, and the information size of uplink assignment control information determined from the bandwidth of an uplink component band associated with the target downlink component band, as a size adjustment reference, and, based on this size adjustment reference, information size adjusting section 103 adjusts the information size of downlink assignment control information. Also, in a dedicated region of the first PDCCH signal, information size adjusting section 103 uses the information size of downlink assignment control information determined from the bandwidth of the target downlink component band in which the first PDCCH signal is sent, as a size adjustment reference, and adjusts the information size of downlink assignment control information based on this size adjustment reference.

On the other hand, as for the second PDCCH signal (that is a PDCCH signal includes both uplink assignment control information and downlink assignment control information) sent in the basic component band, information size adjusting section 103 uses the larger one of the information size of downlink assignment control information determined from the bandwidth of the target downlink component band in which the second PDCCH signal is sent, and the information size of uplink assignment control information determined from the bandwidth of the uplink component band associated with the target downlink component band as a size adjustment reference, and, based on this size adjustment reference, information size adjusting section 103 adjusts the information size of uplink assignment control information and downlink assignment control information.

To be more specific, information size adjusting section 103 includes a padding section (not shown) to adjust the information size of control information by adding zero information to control information. As for the second PDCCH signal, this padding section adds zero information to the smaller one of the information size of downlink assignment control information and the information size of uplink assignment control information until the information size of downlink assignment control information and the information size of uplink assignment control information have equal information size. To which one of downlink assignment control information and uplink assignment control information zero information is added is decided based on information size comparing information.

Also, in a common region of the first PDCCH signal, the padding section adds zero information to downlink assignment control information, until it becomes equal to the target information size determined from the larger one of the information size of downlink assignment information determined from the bandwidth of the target downlink component band in which the first PDCCH signal is sent, and the information size of uplink assignment control information determined from the bandwidth of an uplink component band associated with the target downlink component band. On the other hand, in a dedicated region of the first PDCCH despite which is larger or smaller between the information size of downlink assignment control information determined from the bandwidth of a target downlink component band and the information size of uplink assignment control information determined from the bandwidth of an uplink component band associated with the downlink component band, the padding section adds zero information to downlink assignment control information, until it becomes equal to the target information size determined from the information size of downlink assignment information determined from the bandwidth of a downlink component band in the first PDCCH signal is sent.

Even if the downlink component band of first terminal 200 and the downlink component band of second terminal 200 overlap, the overlapped downlink component band may be the basic component band for first terminal 200 and may be a component band other than the basic component band for second terminal 200.

In this case, while mapping uplink assignment control information and downlink assignment control information to first terminal 200, the PDCCH signal sent in the overlapped downlink component band maps only downlink assignment control information to second terminal 200.

For this reason, the process of mapping uplink assignment control information and downlink assignment control information in PDCCH generating section 102, and the process of information size adjustment of uplink assignment control information and downlink assignment control information in information size adjusting section 103 are performed for each piece of assignment control information included in the target PDCCH signal based on the reference applied to destination terminal 200.

CRC adding section 104 adds a CRC bit to the PDCCH signal subjected to size adjustment in information size adjusting section 103, and then masks the CRC bit with the terminal ID. However, scheduling information related to a broadcast signal which a plurality of terminals needs to receive is masked by an ID that is set in common between a plurality of terminals. Then, CRC adding section 104 outputs the masked PDCCH signal to modulating section 105.

Modulating section 105 modulates a PDCCH signal input from CRC adding section 104, and outputs the modulated PDCCH signal to multiplexing section 108.

Modulating section 106 modulates input transmission data (downlink channel data), and outputs a modulated transmission data signal to multiplexing section 108.

SCH/BCH generating section 107 generates a SCH and a BCH, and outputs the generated SCH and BCH to multiplexing section 108.

Multiplexing section 108 multiplexes the PDCCH signal input from modulating section 105, the data signal (that, is a PDSCH signal) input from modulating section 106, and the SCH and BCH input from SCH/BCH generating section 107. Based on the terminal ID input from control section 101 and downlink assignment control information associated with the terminal ID, multiplexing section 108 maps a data signal (a PDSCH signal) for terminal 200 associated with the terminal ID, to a downlink component band.

Also, multiplexing section 108 maps the PDCCH signal input from modulating section 105, to the dedicated resource region and the common resource region in the resource region allocated for a PDCCH. Specifically, the PDCCH signal associated with a data signal which only a certain terminal should receive, is mapped to the resource associated with the terminal ID of the target terminal in the dedicated resource region, and the PDCCH signal associated with a data signal which a plurality of terminals should receive at once, is mapped to the resource in the common resource region.

IFFT section 109 converts a multiplex signal into a time waveform, and CP adding section 110 acquires an OFDM signal by adding a CP to this time waveform.

RF transmission section 111 performs a radio transmission process (such as up-conversion and a digital-to-analog (D/A) conversion) to an OFDM signal input from CP adding section 110, and transmits the result through an antenna. Then, an OFDM signal including assignment control information is sent.

RF reception section 112 performs a radio receiving process (such as a down-conversion and an analog-to-digital (A/D) conversion) to a received signal which is received in a receiving band through an antenna, and outputs the received signal to CP removing section 113.

CP removing section 113 removes the CP from a received signal, and FFT section 114 converts a received signal, from which the CP is removed, into a frequency domain signal.

Based on uplink assignment control information input from control section 101, extracting section 115 extracts uplink channel data from a frequency domain signal input from FFT section 114, and IDFT (Inverse Discrete Fourier Transform) section 116 converts the extracted signal into a time domain signal and outputs the time domain signal to data reception section 117.

Data reception section 117 decodes the time domain signal input from IDFT section 116. And data reception section 117 outputs decoded uplink channel data as received data.

Figure 3:
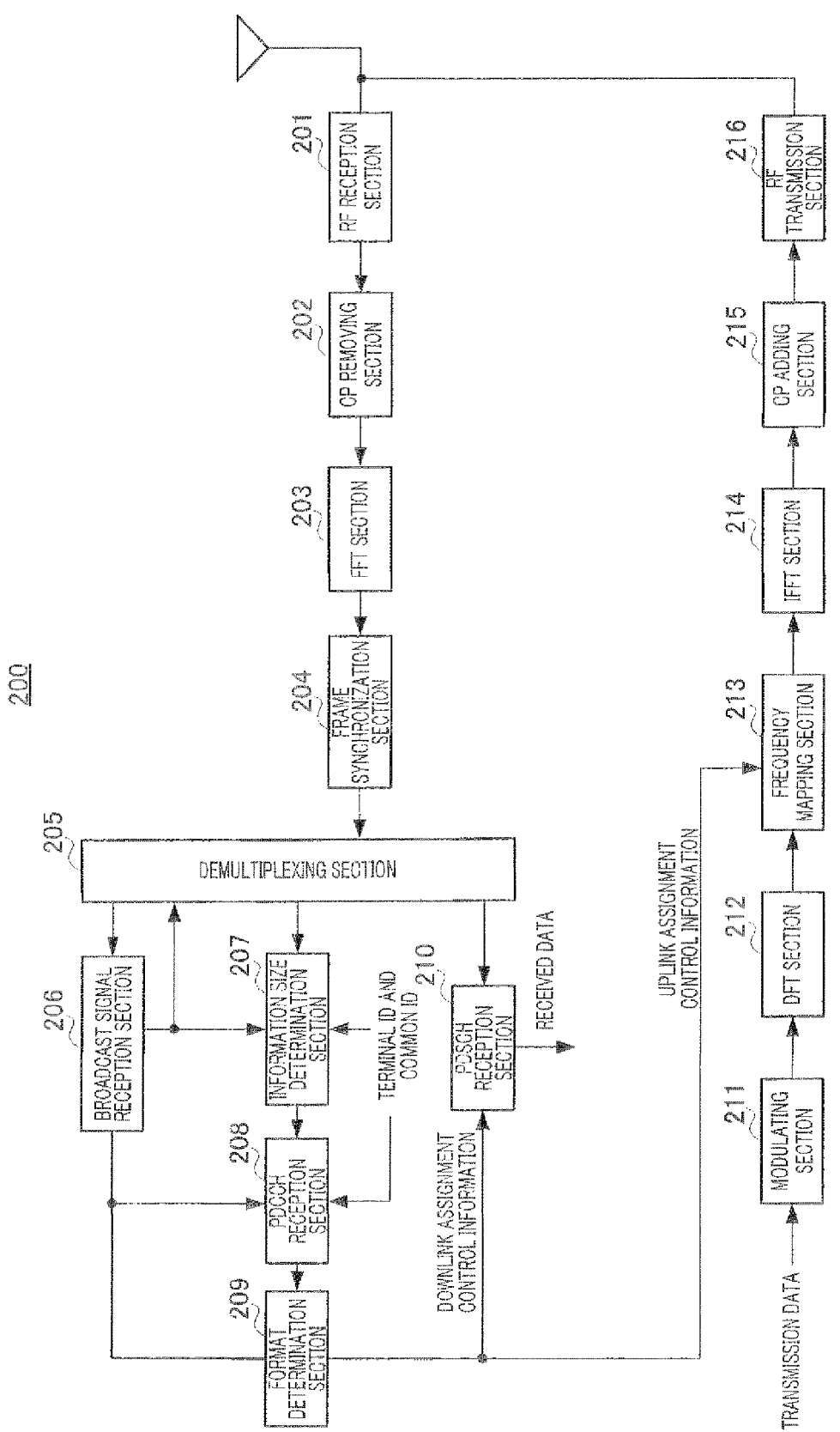
FIG. 3 is a block diagram showing a configuration of a terminal according to Embodiment 1 of the present invention.

FIG. 3 is a block diagram showing the configuration of terminal 200 according to Embodiment 1 of the present invention. In FIG. 3, terminal 200 includes RF reception section 201, CP removing section 202, FFT section 203, frame synchronization section 204, demultiplexing section 205, broadcast signal reception section 296, information size determination section 207, PDCCH reception section 208, format determination section 209, PDSCH reception section 210, modulating section 211, DFT section 212, frequency mapping section 213, IFFT section 214, CP adding section 215, and RF transmission section 216.

RF reception section 201 performs a radio receiving process (such as a down-conversion and an analog-to-digital (A/D) conversion) to a received signal (in this case, an OFDM signal) which is received in a receiving band through an antenna, and outputs the received signal to CP (Cyclic Prefix) removing section 202.

CP removing section 202 removes the CP from a received signal, and FFT (Fast Fourier Transform) section 203 converts a received signal, from which the CP is removed, into a frequency domain signal. This frequency domain signal is output to frame synchronization section 204.

While searching a SCH included in a signal input from FFT section 203, frame synchronization section 204 establishes synchronization (frame synchronization) with base station 100. Also, frame synchronization section 204 acquires the cell ID associated with the sequence used for a SCH (a SCH sequence). That is, the same process as a normal cell search is performed in frame synchronization section 204. Frame synchronization section 204 outputs frame synchronization timing information to show a frame synchronization timing, and the signal input from FFT section 203 to demultiplexing section 205.

Based on frame synchronization timing information input from frame synchronization section 204, demultiplexing section 205 demultiplexes the signal input from frame synchronization section 204 into a broadcast signal (that is, a BCH), a control signal (that is, a PDCCH signal), and a data signal (that is, a PDSCH signal). Demultiplexing section 205 receives information related, to a downlink component band from broadcast signal reception section 206, and based on this information, extracts a PDCCH signal on a per downlink component band basis.

Broadcast signal reception section 206 reads the contents of a BCH input from demultiplexing section 205, and acquires information related to the configuration of the downlink band and uplink band of base station 100. Broadcast signal reception section 206 acquires, for example, the number of uplink component bands, the number of downlink component bands, the identification number and bandwidth of each component band, information associated an uplink component band with a downlink component band, and basic component band information. Broadcast signal reception section 206 outputs acquired BCH information to information size determination section 207, PDCCH reception section 208, and format determination section 209.

Information size determination section 207 receives a PDCCH signal from demultiplexing section 205, and determines the basic information size to perform blind detection on this PDCCH signal. This basic information size is determined based on basic component band information, which is received from broadcast signal reception section 206, and the bandwidth of each component band.

Specifically, in a common region of a PDCCH signal of a downlink component band other than the basic component band (that is, a common region of a PDCCH signal of a component band which does not include uplink assignment information for terminal 200), information size determination section 207 uses the larger one of the information size of downlink assignment control information determined from the bandwidth of a downlink component band in which the PDCCH signal is sent, and the information size of uplink assignment control information determined from the bandwidth of an uplink component band associated with the target downlink component band, as information size reference, and, in a dedicated region, decides the basic information size based on the information size of downlink assignment control information determined from the bandwidth of the target downlink component band.

Also, as for a PDCCH signal of the basic component band (that is, a PDCCH signal of a component band includes both uplink assignment information for terminal 200 and downlink assignment information), information size determination section 207 uses the larger one of the information size of downlink assignment control information determined from the bandwidth of a target downlink component band in which the PDCCH signal is sent, and the information size of uplink assignment control information determined from the bandwidth of an uplink component band associated with the target downlink component band as information size reference.

Information size determination section 207 outputs information related to the determined basic information size, and the PDCCH signal associated with this information to PDCCH reception section 208.

PDCCH reception section 208 performs blind detection for a PDCCH signal based on the basic information size decided in information size determination section 207.

That is, PDCCH reception section 208 specifies the CRC bit part using the basic information size (payload size) decided in information size determination section 207. Next, after demasking the specified CRC bit part using the terminal ID of terminal 200 in a dedicated region, PDCCH reception section 208 decides the PDCCH signal as a PDCCH signal transmitted for terminal 200, if the CRC calculation result is "OK" with respect to the whole PDCCH signal. However, since in a common region there is a possibility that both assignment information for terminal 200 and assignment information to be received by a plurality of terminals (for example, broadcast signal scheduling information) may be sent, in a common region, PDCCH reception section 208 performs both damasking process by the terminal ID of terminal 200 and damasking process by an ID set in common between a plurality of terminals, and executes the CRC calculation. Thus, the PDCCH signal that is decided to be received by terminal 200 is output to format determination section 209.

Based on type information of assignment control information included in a PDCCH signal received from PDCCH reception section 208, format determination section 209 decides whether the format of the PDCCH signal is format 0 or format 1A. When determining on format 0, format determination section 209 outputs uplink assignment control information included in the PDCCH signal, to frequency mapping section 213. Also, when determining on format 1A, format determination section 209 outputs downlink assignment control information included in the PDCCH signal, to PDSCH reception section 210.

Based on downlink assignment control information input from format determination section 209, PDSCH reception section 210 extracts received data from the PDSCH signal input from demultiplexing section 205.

Modulating section 211 modulates transmission data and outputs a resulting modulated signal to DFT (Discrete Fourier Transform) section 212.

DFT section 212 converts a modulated signal, which is input from modulating section 211, into a frequency domain, and outputs a resulting plurality of frequency components to frequency mapping section 213.

In accordance with uplink assignment control information input from format determination section 209, frequency mapping section 213 maps a plurality of frequency components input from DFT section 212, on a PUSCH placed in an uplink component band.

IFFT section 214 converts a mapped plurality of frequency components into a time domain waveform, and CP adding section 215 adds a CP to the time domain waveform.

RF transmission section 216 performs a radio transmission process (such as an up-conversion and a digital-to-analog (D/A) conversion) to a CP added signal, and transmits it through an antenna.

Figure 4:
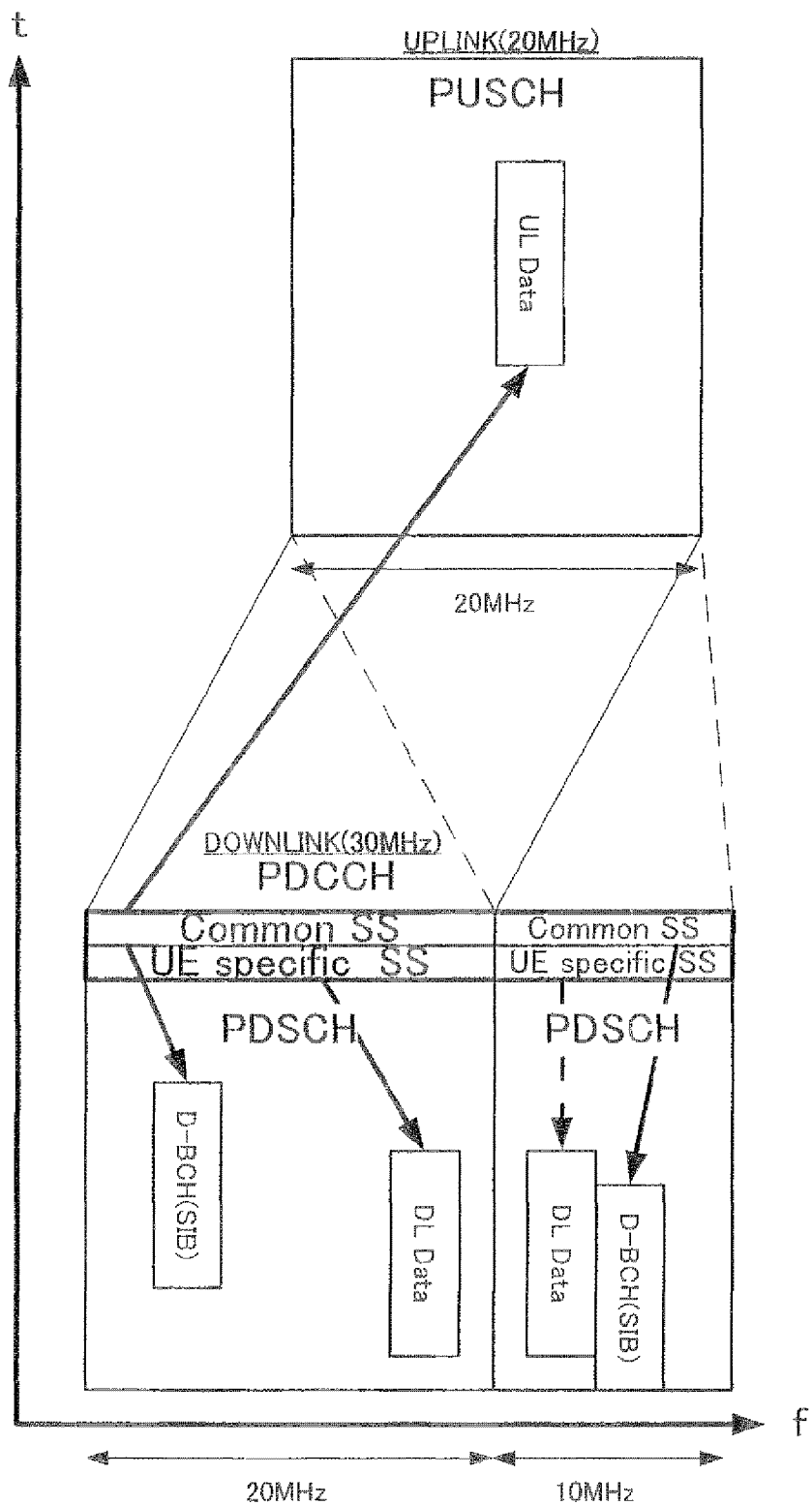
FIG. 4 shows operations of a base station and a terminal.

Next, an operation of base station 100 and terminal 200, which has the above mentioned configuration, is described. FIG. 4 is a view for explaining an operation of base station 100 and terminal 200.

In FIG. 4, one uplink component band UB1 is associated with two downlink component bands DB1 and DB2 as a component band group for first terminal 200. In FIG. 4, the bandwidth of UB1 and DB1 are 20 MHz and the bandwidth of DB2 is 10 MHz. DB 1 is defined as a basic component band for first terminal 200 here.

Base station 100 determines uplink component band UB1 as uplink channel resource to first terminal 200, and downlink component bands DB1 and DB2 as downlink channel resource.

Then, base station 100 includes uplink assignment control information and downlink assignment control information into the PDCCH signal, and transmits them to terminal 200.

However, base station 100 does not transmit uplink assignment control information for first terminal 200 in all downlink component bands allocated to first terminal 200, and base station 100 transmits uplink assignment control information only in part of the downlink component bands. On the other hand, base station 100 transmits downlink resource assignment information in all downlink component bands allocated to first terminal 200.

In the case of FIG. 4, since DB1 is the basic component band for first terminal 200, a PDCCH signal to be sent in DB1 includes both uplink assignment control information and downlink assignment control information. On the other hand, a PDCCH signal to be sent in DB2 includes downlink assignment control information only. The arrow from a PDCCH towards uplink data (UL Data) shows that uplink assignment control information is sent in the PDCCH. Also, the arrow from a PDCCH towards downlink data (DL Data) or towards a D-BCH shows that downlink assignment control information is sent in the PDCCH.

Also, the information size of a PDCCH signal is adjusted if necessary. In information size adjusting section 103, this information size adjustment is performed for a PDCCH signal (that is, a PDCCH signal of the basic component band) of a component band including both uplink assignment control information and downlink assignment control information, and for downlink assignment control information included in a common region of a PDCCH signal sent in a band other than a basic component band. Specifically, as for a basic component band, information size adjusting section 103 adds zero information to the smaller one of the information size of downlink assignment control information and the information size of uplink assignment control information until the information size of downlink assignment control information and the information size of uplink assignment control information have equal information size. Also, as for downlink assignment control information included in a common region of the PDCCH signal sent with a downlink component band other than the basic component band, information size adjusting section 103 uses the larger one of the information size of downlink assignment control information determined from the bandwidth of a downlink component band in which the first PDCCH signal is sent, and the information size of uplink assignment control information determined from the bandwidth of an uplink component band associated with the target downlink component band as a size adjustment reference, and, adjusts the information size.

On the other hand, the size of downlink assignment control information included in a dedicated region of a PDCCH signal sent by component band other than a basic component band is decided only from the bandwidth of a downlink component band which sends downlink assignment control information.

Here, the method of determining size adjustment reference of downlink assignment control information will be described in detail.

FIG. 5 through FIG. 8 is a diagram showing the method of determining size adjustment reference of downlink assignment control information.

Figure 5:
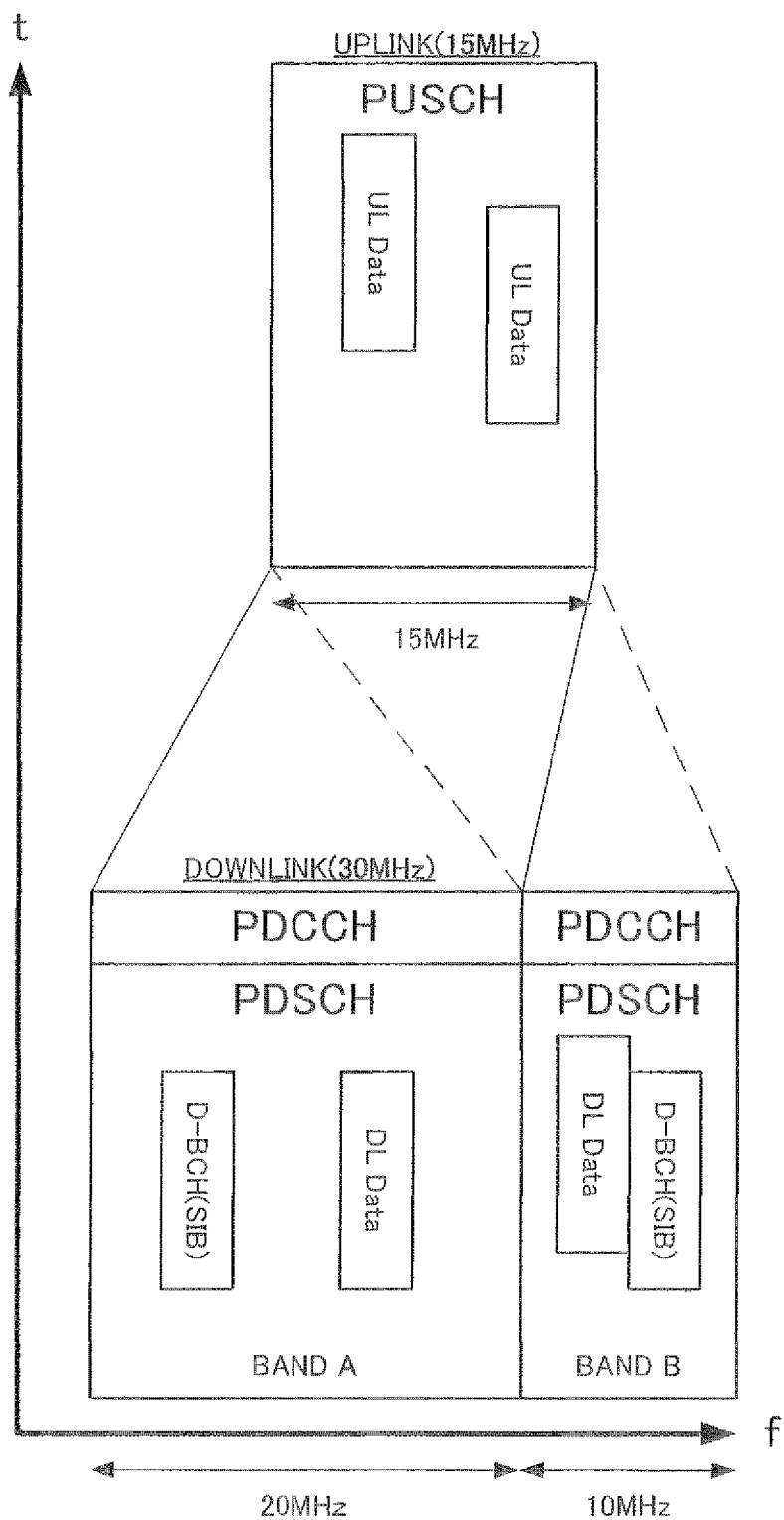
FIG. 5 shows the method of determining size adjustment reference of downlink assignment control information.

At first, a case will be described where a component band group shown in FIG. 5 is allocated to first through third terminal 200 (in FIG. 6, shown as UE A, UE B, and UE C). In FIG. 5, a component band group is composed of a downlink component band (band A) of a 20 MHz bandwidth, a downlink component band (band B) of a 10 MHz bandwidth, and an uplink component band of a 15 MHz bandwidth.

FIG. 6 shows a component band type for each band (that is, information illustrates whether a basic component band (a band where uplink assignment control information (UL grant) is sent) or a component band other than the basic component band) and size adjustment reference in each bandwidth of a dedicated region and a common region for each UE.

As shown in FIG. 6, band A is a basic component band for UE A. Also, band B is a basic component band for UE B. Also, both band A and B are a basic component band for UE C.

What has to be focused on here is the size adjustment reference in a dedicated region in band B for UE A. As mentioned above, in a dedicated region of the downlink component band other than a basic component band, despite which is larger or smaller between the information size of downlink assignment control information determined from the bandwidth of a target downlink component band and the information size of uplink assignment control information determined from the bandwidth of a uplink component band associated with the downlink component band, the information size of downlink assignment control information determined from the bandwidth of a target downlink component band is used as a size adjustment reference. That is, unlike a basic component band, which always uses the larger one of the information size of uplink assignment control information and downlink assignment control information determined from the bandwidth, as a size adjustment reference, in a dedicated region of a downlink component band other than a basic component band, even if the information size of downlink assignment control information determined from a downlink bandwidth is smaller than the information size of uplink assignment control information determined from a uplink component bandwidth, the information size of downlink assignment control information determined from the bandwidth of a downlink component band, is used as a size adjustment reference. In this case, it is not necessary to perform size adjustment by zero padding to downlink assignment control information, it is possible to prevent the quality of downlink assignment control information from being deteriorated.

On the other hand, in a common region, it is required to use the larger one of the information size of downlink assignment control information determined from the bandwidth of a downlink component band and the information size of uplink assignment control information determined from the bandwidth of a uplink component band associated with the target downlink component band, as a size adjustment reference. This is because a case might occur where a downlink component band is not the basic component for one terminal 200 but is the basic component band for another terminal 200, and, in a common region, a control signal, associated with a downlink data signal to be received by a plurality of terminals at once, is transmitted. Thus, considering a certain terminal 200 alone, in a common region of a downlink component band other than a basic component band, as in a dedicated region, the information size of downlink assignment control information determined from the bandwidth of a downlink component band can be used as a size adjustment reference. However, since it is a basic component band for another terminal 200, in this basic downlink component band, uplink assignment control information, which is necessary for other terminal 200, may be transmitted in addition to a control signal associated with a data signal, which a plurality of terminals should receive at once. Thus, to let all terminals 200 successfully receive a control signal associated with a downlink signal which should be received at once, and to let all terminals 200 successfully receive uplink assignment control information, in a common region, the same selection reference of size adjustment reference as a basic component band is used, that the larger one of the information size of uplink assignment control information and the information size of downlink assignment control information determined from the bandwidth is used as a size adjustment reference.

Figure 7:
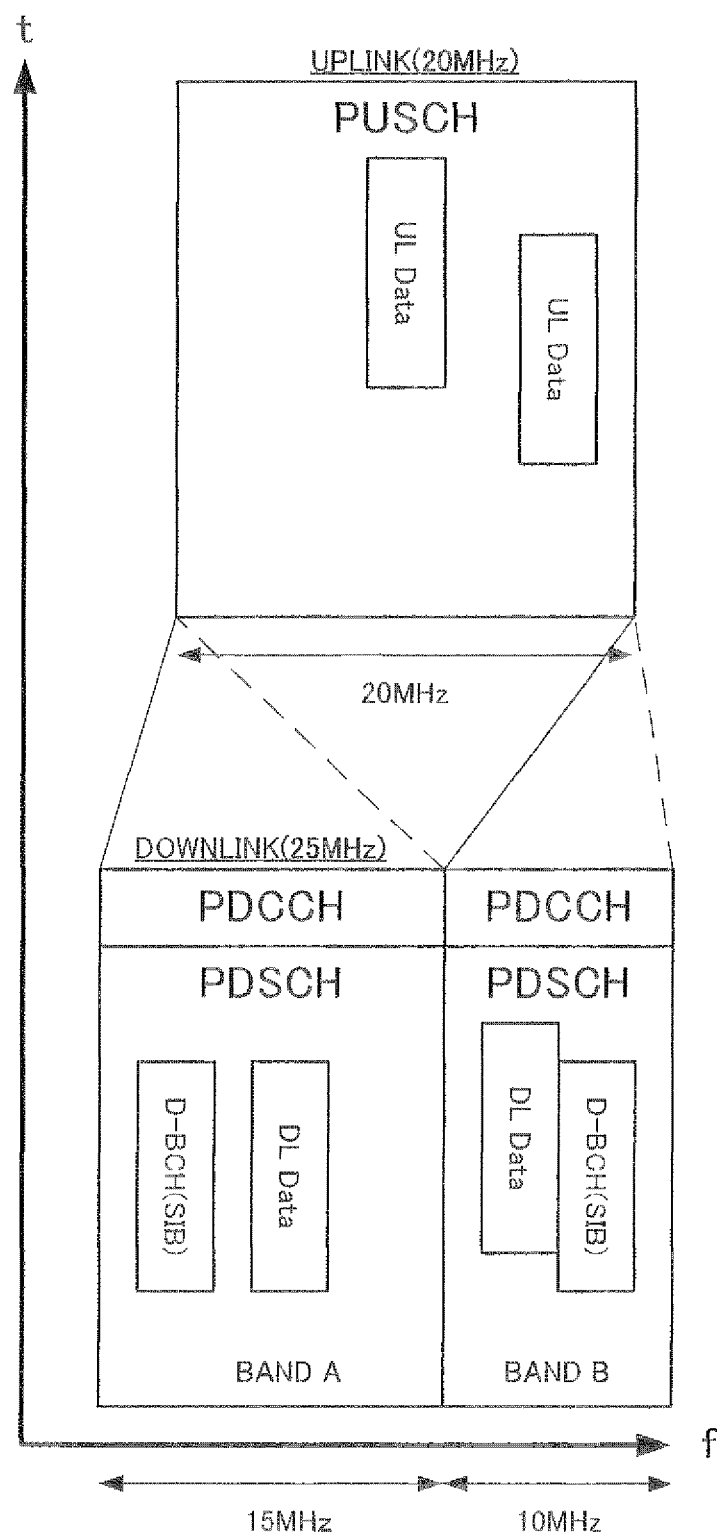
FIG. 7 shows the method of determining size adjustment reference of downlink assignment control information.

Next, a case will be described where a component band group shown in FIG. 7 is allocated to first through third terminal 200 (in FIG. 8, shown as UE A, UE B, and UE C). In FIG. 7, a component band group is composed of a downlink component band (band A) of a 15 MHz bandwidth, a downlink component band (band B) of a 10 MHz bandwidth, and an uplink component band of a 20 MHz bandwidth.

FIG. 8 shows for each UE a component band type of each band and a size adjustment reference in a dedicated region and a common region of each band.

What has to be focused on here is the size adjustment reference in a dedicated region of band B for UE A and in a dedicated region of band A for UE B. That is, in a dedicated region of a downlink component band other than a basic component hand, the information size of downlink assignment control information determined from the bandwidth of a downlink component band, is used as a size adjustment reference, so that a component band group shown in FIG. 7 always uses not the information size of uplink assignment control information determined from a uplink component band, but the information size of downlink assignment control information determined from the bandwidth of a downlink component band having narrow bandwidth. In this case, it is not necessary to perform size adjustment by zero padding to downlink assignment control information, it is possible to prevent the quality of downlink assignment control information from being deteriorated.

A PDCCH signal, mapping process of assignment control information and information size adjustment process are performed as mentioned above, are received by terminal 200.

In terminal 200, information size determination section 207 decides a basic information size onto performing a blind detection on a received PDCCH signal. This basic information size is determined based on basic component band information received from broadcast signal reception section 206, and the bandwidth of each component band.

Specifically, in a common region of a PDCCH signal of a downlink component band other than the basic component band (that is, a common region of a PDCCH signal which does not include uplink assignment information for terminal 200), information size determination section 207 uses the larger one of the information size of downlink assignment control information determined from the bandwidth of a target downlink component band in which the PDCCH signal is sent, and the information size of uplink assignment control information determined from the bandwidth of an uplink component band associated with the target downlink component band as a size adjustment reference, and, on the other hand, in a dedicated region, decides the basic information size based on the information size of downlink assignment control information determined from the bandwidth of the target downlink component hand.

Also, as for a PDCCH signal of the basic component band (that is, a PDCCH signal includes both uplink assignment information and downlink assignment information for terminal 200), information size determination section 207 uses the larger one of the information size of downlink assignment control information determined from the bandwidth of a target downlink component band in which the PDCCH signal is sent, and the information size of uplink assignment control information determined from the bandwidth of an uplink component band associated with the target downlink component band as a size adjustment reference.

Then, PDCCH reception section 208 performs blind detection on a PDCCH signal based on a basic information size determined by information size determination section 207.

That is, PDCCH reception section 208 specifies the CRC bit part included in a PDCCH signal according to a basic information size. Although the difference between basic information sizes makes locations of CRC bit parts in PDCCH signals different, PDCCH reception section 208 can specify a CRC bit part of a PDCCH signal sent from each region, by receiving information of a basic information size in a dedicated region and a common region of each downlink component band determined in information size determination section 207.

Next, after demasking the specified CRC bit part determined by the terminal ID of terminal 200 or by a common ID among a plurality of terminals, PDCCH reception section 208 decides the PDCCH signal as a PDCCH signal transmitted for terminal 200 if CRC calculation result is "OK" with respect to the whole PDCCH signal.

Also, based on type information of resource assignment information included in a PDCCH signal received from PDCCH reception section 208, format determination section 209 decides whether the format of the PDCCH signal is format 0 or format 1A.

According to the above explanation, a PDCCH signal received in a dedicated region of a downlink component band other than a basic component band is always a downlink allocation signal, so that the type information of resource assignment information is always supposed to indicate downlink assignment control information. That is, the parts associated with the type information of resource assignment information can be used like a parity bit, or can be used to transmit other kinds of information.

Although in the above description it has been shown that base station 100 reports basic component band information to terminal 200 separately, but, when the uplink component band and downlink component band are not symmetric, for example, the technical specification can define that the downlink component band having low frequency as "basic component band." That is, the method of reporting "basic component band" is not limited specifically.

Although in the above description it has been shown that the number of uplink component bands and the number of downlink component bands that a base station supports are not symmetric, the present embodiment is not limited to this. That is, even if the number of uplink component bands and the number of downlink component bands that a base station supports are symmetric, the present embodiment can be applied if the number of component bands allocated to each terminal (that is, instructed by a base station to receive) is asymmetric in the uplink and downlink.

The present embodiment limits allocating a PDCCH signal including uplink assignment control information to part of downlink component band, and by this means reduces the possibility of performing zero padding to downlink assignment control information that is higher significance.

Also, a PDCCH signal of a downlink component band other than the basic component band includes downlink resource assignment information alone. Then, in a dedicated region of the downlink component band other than the basic component band, the information size of downlink assignment control information determined from the bandwidth of a downlink component band is always used as a size adjustment reference, so that there is no need to perform information size adjustment. It is not necessary to perform zero padding to downlink assignment control information, it is possible to prevent the quality of downlink assignment control information from being deteriorated. Similarly, as for uplink assignment control information, the number and frequency of padding can be minimized.

However, in a common region of a downlink component band other than the basic component band, the larger one of the information size of downlink assignment control information determined from the bandwidth of a downlink component band and the information size of uplink assignment control information determined from the bandwidth of an uplink component band associated with the target downlink component band, is used as a size adjustment reference. Therefore, even if different basic component bands are applied to each terminal 200, terminal 200 on the receiving side can transmit downlink assignment control information without problem.

According to the above explanation, in a downlink component band other than the basic component band, neither a dedicated region nor a common region transmits uplink assignment control information to given terminal 200. However, the present invention is not limited to this, and it is equally possible to transmit uplink assignment control information in a common region, even in a downlink component band other than the basic component band. Therefore, in a common region, the selection reference of a size adjustment reference is the same as the selection reference of the basic component band, so that as in the basic component band, it is possible to match the information size between uplink assignment control information and downlink assignment control information. By this means, it is possible to enhance flexibility of the scheduler in base station 100 without increasing the number of blind detection in terminal 200.

That is, PDCCH generating section 102 includes downlink assignment control information for given terminal 200, in a common region and a dedicated region of all channel signals to be sent in a downlink band allocated to target terminal 200, includes uplink assignment control information to be sent to arbitrary terminal 200, and on the other hand includes only to some part of the channel signal in a dedicated region, to at least part of the channel signal in a common region. In a common region of all channel signals of a downlink component band allocated to target terminal 200, information size adjusting section 103 uses the larger one of the information size of downlink assignment control information determined from the bandwidth of a downlink component band where the channel signal having the target common region is transmitted, and the information size of uplink assignment control information determined from the bandwidth of an uplink component band associated with the target downlink component band, as a size adjustment reference. In a dedicated region including uplink allocated control information to for target terminal 200, information size adjusting section 103 uses the larger one of the information size of downlink assignment control information determined from the bandwidth of a downlink component band in which a channel signal having a dedicated region is sent, and the information size of uplink assignment control information determined from the bandwidth of an uplink component band associated with the target downlink component band, as a reference of size adjustment. In a dedicated region which does not include uplink allocated control information for target terminal 200, information size adjusting section 103 uses the information size of downlink assignment control information determined from the bandwidth of a downlink component band in which a channel signal having a dedicated region is sent, as a size adjustment reference.

Embodiment 2

As Embodiment 1, the present embodiment explains the configuration, when the communication bandwidth (the number of basic component band) is asymmetric between an uplink and a downlink, in a common region, an LIE-A system specific broadcast information (D-BCH+) (that is, an LTE terminal does not need to receive) and broadcast information of an LTE system (D-BCH) are transmitted one after another by time division.

Figure 9:
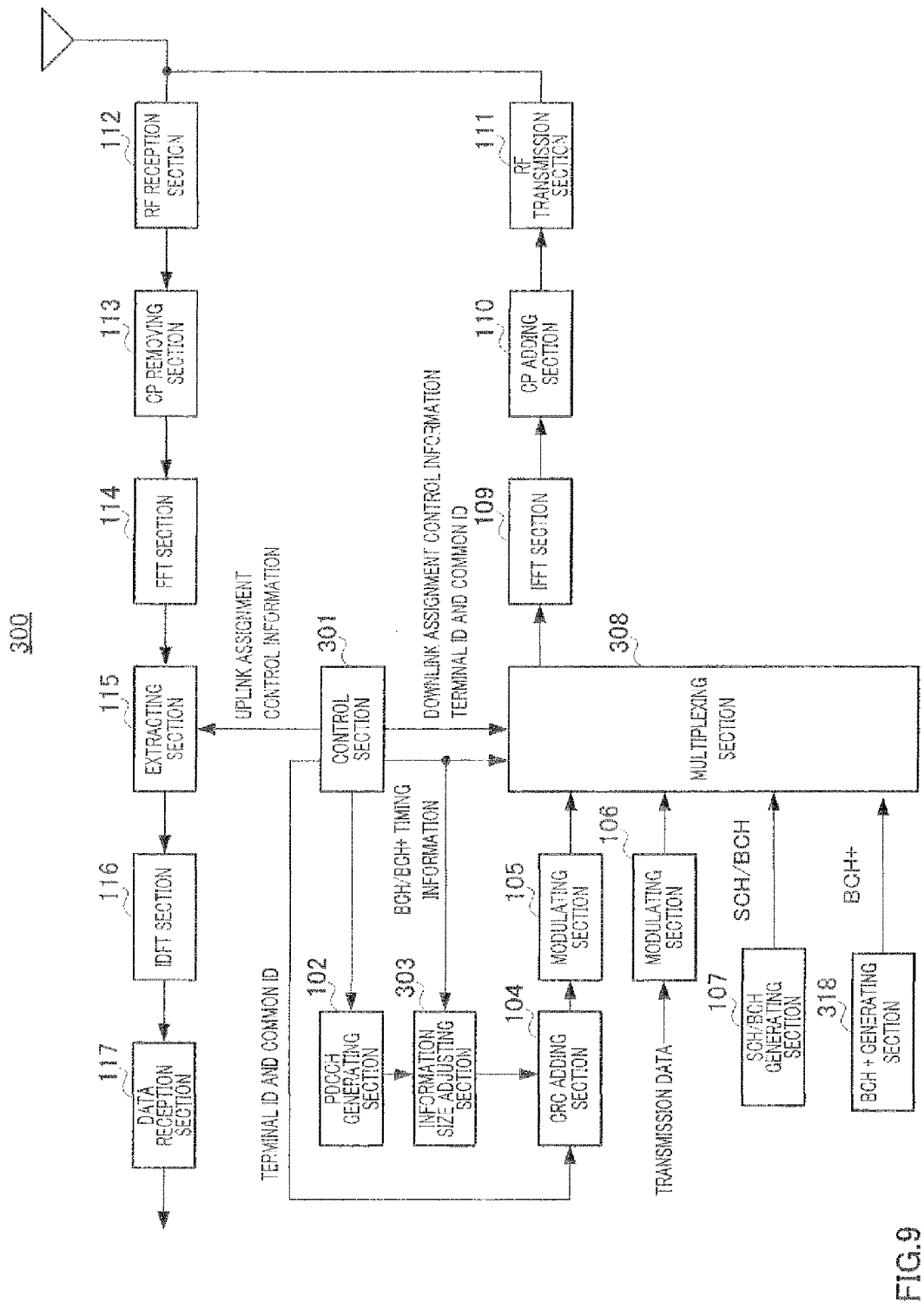
FIG. 9 is a block diagram showing a configuration of a base station according to Embodiment 2 of the present invention.

FIG. 9 is a block diagram showing the configuration of base station 300 of Embodiment 2 of the present invention. Compared to base station 100 of Embodiment 1 shown in FIG. 2, base station 300 shown in FIG. 9 adds BCH+ generating section 318 and includes control section 301 instead of control section 101, information size adjusting section 303 instead of information size adjusting section 103, and multiplexing section 308 instead of multiplexing section 108. Parts in FIG. 9 that are the same as in FIG. 2 will be assigned the same reference numerals as in FIG. 2 and overlapping descriptions will be omitted.

As control section 101, control section 301 generates control information (including uplink assignment control information and downlink assignment control information), region assignment information showing each pieces of control information indicating whether each control information should be allocated to a dedicated region or a common region, and BCH/BCH+ timing information. Also, control information and region assignment information include the same information as in embodiment 1.

Also, control section 301 allocates downlink assignment control information for given terminal 400 to all of a plurality of downlink component bands that form a component band group set for this terminal 400, and on the other hand, allocates uplink assignment control information for given terminal 400 only to part of the plurality of is downlink component bands. Here, as embodiment 1, an allocation target downlink component band where uplink assignment control information is allocated is "basic component band," and information related to this basic component band is above mentioned "basic component band information."

Also, control section 301 outputs information size comparing information, showing the difference between the information size of downlink assignment control information determined from the bandwidth of a basic component band, and the information size of uplink assignment control information determined from the bandwidth of an uplink component band associated with the downlink component band, and BCH/BCH+ timing information, to information size adjusting section 303 and multiplexing section 308. Also, BCH/BCH+ timing information is shared with all terminals 400 in advance.

As Embodiment 1, control section 301 outputs generated control information and region assignment information to PDCCH generating section 102, outputs uplink assignment control information to extracting section 115, and outputs terminal ID and common ID to CRC adding section 104.

Information size adjusting section 303 receives control information generated in control section 301, region assignment information, and BCH/BCH+ timing information. Based on these control information, region assignment information, and BCH/BCH+ timing information, information size adjusting section 303 adjusts the information size of uplink assignment control information and downlink assignment control information included in a PDCCH signal received from PDCCH generating section 102.

Specifically, based on basic component band information, information size adjusting section 303 determines whether a PDCCH signal subject to information size adjustment should be transmitted in the basic component band or in a different downlink component band.

Then, as for a common region of the first PDCCH signal (that is, a PDCCH signal which does not include uplink assignment information) to be sent in a downlink component band other than the basic component band, in the subframe where a BCH for an LTE terminal should be transmitted in a downlink component band other than the basic component band, information size adjusting section 303 uses the larger one of the information size of downlink assignment control information determined from the bandwidth of a downlink component band in which the first PDCCH signal is sent, and the information size of uplink assignment control information determined from the bandwidth of an uplink component band associated with the target downlink component band as information size adjustment, and, based on this size adjustment reference, adjusts the information size of downlink assignment control information. Also, as for a common region of the first PDCCH signal, in the subframe where a BCH+ for an LTE-A terminal should be transmitted in a downlink component band other than the basic component band, information size adjusting section 303 uses the information size of downlink assignment control information determined from the bandwidth of a target downlink component band in which the first PDCCH signal is sent, and based on this size adjustment reference, adjusts the information size of downlink assignment control information.

Also, in a dedicated region of the first PDCCH signal, information size adjusting section 303 uses the information size of downlink assignment control information determined from the bandwidth of a target downlink component band in which the first PDCCH signal is sent, as a size adjustment reference, and based on this size adjustment reference, adjusts the information size of downlink assignment control information.

On the other hand, as for the second PDCCH signal (that is a PDCCH signal includes both uplink assignment control information and downlink assignment control information) to be sent in the basic component band, information size adjusting section 303 uses the larger one of the information size of downlink assignment control information determined from the bandwidth of a downlink component band in which the second PDCCH signal is sent, and the information size of uplink assignment control information determined from the bandwidth of an uplink component band associated with the target downlink component band as size adjustment reference, and, based on this size adjustment reference, adjusts the information size of uplink assignment control information and downlink assignment control information.

To be more specific, as in embodiment 1, information size adjusting section 303 includes a padding section (not shown) to adjust the information size of control information by adding zero information to control information.

BCH+ generating section 318 generates BCH+ being broadcast information for an LTE-A terminal, and outputs generated BCH+ to multiplexing section 308.

Multiplexing section 308 multiplexes the PDCCH signal input from modulating section 105, the data signal (that is, a PDSCH signal) input from modulating section 106, the SCH and BCH input from SCH/BCH generating section 107, and BCH+ input from BCH+ generating section 318. Based on the terminal. ID input from control section 301 and downlink assignment control information associated with the terminal ID, multiplexing section 308 maps a data signal (a PDSCH signal) for terminal 400 associated with the terminal ID, to a downlink component band.

Also, multiplexing section 308 maps the PDCCH signal input from modulating section 105, to the dedicated resource region and the common resource region in the resource region allocated for a PDCCH. Specifically, the PDCCH signal associated with a data signal which only a certain terminal should receive, is mapped to the resource associated with the terminal ID of the target terminal in a dedicated resource region, and the PDCCH signal associated with a data signal which a plurality of terminals should receive at once, is mapped to the resource in the common resource region.

Also, based on BCH/BCH+ timing information input from control section 301, multiplexing section 308 multiplexes BCH with PDSCH and PDCCH at the timing BCH should be transmitted, and multiplexes BCH+ with PDSCH and PDCCH at the timing BCH+ should be transmitted. That is, BCH and BCH+ are multiplexed by time division.

Figure 10:
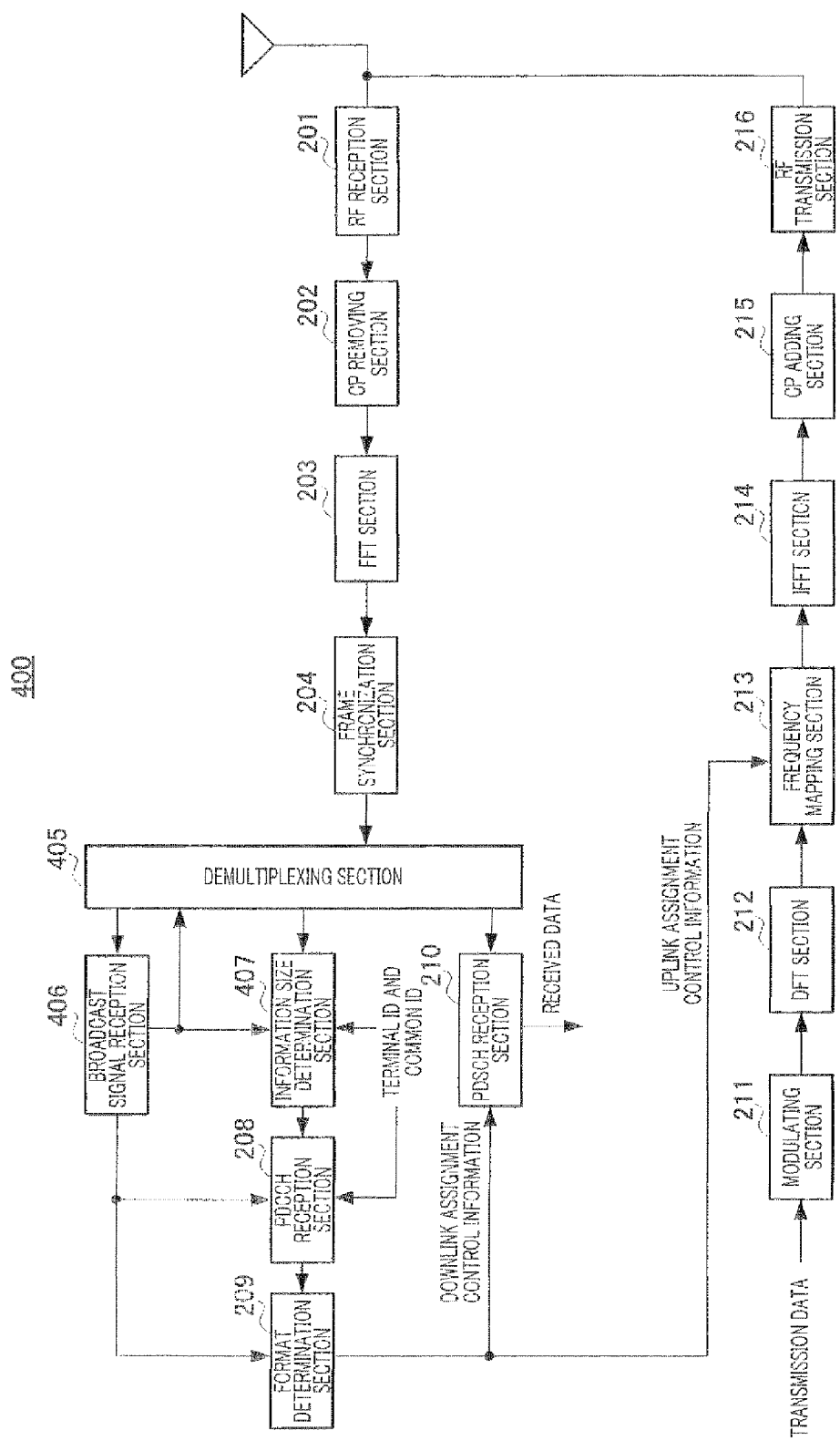
FIG. 10 is a block diagram showing a configuration of a terminal according to Embodiment 2 of the present invention.

FIG. 10 is a block diagram showing the configuration of terminal 400 according to embodiment 2 of the present invention. Compared to terminal 200 of Embodiment 1 shown in FIG. 3, terminal 400 shown in FIG. 10 includes demultiplexing section 405 instead of demultiplexing section 205, broadcast signal reception section 406 instead of broadcast signal reception section 206, and information size determination section 407 instead of information size determination section 207. Also, parts in FIG. 10 that are, the same as in FIG. 3 will be assigned the same reference numerals as in FIG. 3 and overlapping descriptions will be omitted.

Based on frame synchronization timing information input from frame synchronization section 204, demultiplexing section 405 demultiplexes the signal input from frame synchronization section 204 into broadcast signal (that is, a BCH and a BCH+), a control signal (that is, a PDCCH signal), and a data signal (that is, a PDSCH signal). Demultiplexing section 405 receives information related to a downlink component band from broadcast signal reception section 406, and based on this information, extracts PDCCH signals on a per downlink component band basis. Also, demultiplexing section 405 holds BCH/BCH+ timing information which is shared between all terminals 400 in advance by means of reporting from base station 300, and demultiplexes BCH and BCH+ from a signal input from frame synchronization section 204 based on this timing information.

Broadcast signal reception section 406 reads the contents of BCH and BCH+ input from demultiplexing section 405, and as Embodiment 1 receives information related to the configuration of the downlink band and uplink band of base station 300. Broadcast signal reception section 406 acquires, for example, the number of uplink component bands, the number of downlink component bands, the identification number and bandwidth of each component band, information associated an uplink component band with a downlink component band, and basic component band information. Broadcast signal reception section 406 outputs acquired BCH and BCH+ information to information size determination section 407, PDCCH reception section 208, and format determination section 209.

Information size determination section 407 receives a PDCCH signal and BCH/BCH+ timing information from demultiplexing section 405, and determines the basic information size to perform blind detection on this PDCCH signal. This basic information size is determined based on basic component band information, which is received from broadcast signal reception section 406, the bandwidth of each component band, and BCH/BCH+ timing information.

Specifically, as for a common region of a PDCCH signal of a downlink component band other than the basic component band (that is a common region of a PDCCH signal of a component band which does not include uplink assignment information for terminal 200), in the subframe where a BCH for an LTE terminal should be transmitted in the target downlink component band, information size determination section 407 uses the larger one of the information size of downlink assignment control information determined from the bandwidth of a downlink component band in which the PDCCH signal is sent, and the information size of uplink assignment control information determined from the bandwidth of an uplink component band associated with the target downlink component band, as size adjustment reference, and, as for a common region of a PDCCH signal of a downlink component band other than the basic component band, in the subframe where a BCH+ for an LTE-A terminal should be transmitted in the target downlink component band, decides the basic information size based on the information size of downlink assignment control information determined from the bandwidth of the target downlink component band.

Also, in a dedicated region of a PDCCH signal of a downlink component band other than the basic component band, information size determination section 407 decides the basic information size based on the information size of downlink assignment control information decided from the bandwidth of the target downlink component band.

Also, as for a PDCCH signal of the basic component band (that is, a PDCCH signal includes both uplink assignment information and downlink assignment information for terminal 200), information size determination section 407 uses the larger one of the information size of downlink assignment control information determined from the bandwidth of a target downlink component band in which the PDCCH signal is sent, and the information size of uplink assignment control information determined from the bandwidth of an uplink component band associated with the target downlink component band as a size adjustment reference.

Information size determination section 407 outputs information about the decided basic information size and the PDCCH signal associated with this information to PDCCH reception section 208.

Next, operation of base station 300 and terminal 400 employing the above mentioned configuration will be explained with reference of FIG. 4 and FIG. 10. FIG. 4 is a conceptual diagram showing the timing a BCH for an LTE terminal is transmitted in the right downlink component band of base station 300, and FIG. 11 is a conceptual diagram of a control signal at the timing a BCH+ for an LTE-A terminal is transmitted in the right downlink component band of base station 300.

Differences between FIG. 11 and FIG. 4 include whether scheduling information of (D−) BCH will be transmitted in Format 1A, in which transmission uses a PDCCH in a common region, or whether scheduling information of (D−) BCH+ will be transmitted, and the difference between the sizes of Format 1A. That is, FIG. 4 shows the first subframe where (D−) BCH scheduling information is transmitted, FIG. 11 shows the second subframe where (D−) BCH+ scheduling information is transmitted. As mentioned above, as for a common region of a PDCCH signal of a downlink component band other than the basic component band, in the subframe where a BCH+ for an LTE-A terminal should be transmitted in the target downlink component band, base station 300 and terminal 400 determine the basic information size based on the information size of downlink assignment control information determined from the bandwidth of a target downlink component band, and, by this means, even if the uplink bandwidth is wider than the bandwidth of a target downlink component band, do not perform a padding for Formal 1A. Therefore, in a common region, it is possible to avoid unnecessary padding for Format 1A. However, at the point when a BCH for an LTE is transmitted in the target downlink component band, to perform the same padding process as for an LTE terminal, backward compatibility can be kept.

Embodiments of the present invention have been described above.

Also, with the above embodiments, the relationship between a downlink component band and an uplink component band has been reported by a BCH from a base station. However, until a terminal receives (part of BCHs) a BCH showing the relationship with an uplink component band, a terminal cannot calculate the information size of Format 1A that should be determined by taking into account both the bandwidth of a downlink component band and the bandwidth of an uplink component band. For this reason, when the bandwidth of an uplink component band is unknown on the terminal side, the information size of Format 1A will be calculated on the premise that the bandwidth of the known downlink component band and the bandwidth of the unknown uplink component band are the same.

However, in this case, depending on the relationship between the actual frequency bandwidth of an uplink component band and the frequency bandwidth of a downlink component band, the size of Format 1A a base station actually uses, and the size of Format 1A assumed before a terminal receives information of an uplink component band, may differ. To avoid this problem, only scheduling information for a special BCH for reporting a frequency location or a frequency bandwidth of an uplink component band can be transmitted in a special format other than Format 1A.

Each embodiment mentioned above explains an example when the present invention is performed by hardware, but the present invention can be implemented with software.

Furthermore, each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells in an LSI can be regenerated is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosures of Japanese Patent Application No. 2008-306742, filed on Dec. 1, 2008, and Japanese Patent Application No. 2009-079674, filed on Mar. 27, 2009, including the specifications, drawings and abstracts, are incorporated herein by reference in their entirety.

INDUSTRIAL APPLICABILITY

The radio terminal, radio base station, channel signal forming method and channel signal receiving method of the present invention are useful to prevent the quality of downlink assignment control information from degrading.

The invention claimed is:

1. A user equipment (UE) comprising:
    an information size determination section configured to determine a first basic information size of control information mapped on a UE specific search space in a first component carrier; and
    a receiver configured to monitor the control information mapped on the UE specific search space based on the determined first basic information size,
    wherein a first determination method for determining the first basic information size is different from a second determination method for determining a second basic information size of control information mapped on a common search space in the first component carrier, and
    the first determination method for determining the first basic information size is different from a third determination method for determining a third basic information size of control information mapped on a search space in a second component carrier that is different from the first component carrier.

2. The user equipment according to claim 1, wherein the third basic information size is determined according to a larger one of a first information size determined from a downlink bandwidth of the second component carrier and a second information size determined from an uplink bandwidth of an uplink component carrier.

3. The user equipment according to claim 1, wherein the first basic information size is determined according to an information size determined from a bandwidth of the first component carrier.

4. The user equipment according to claim 1, wherein
a number of one or more uplink component carrier(s) assigned to the UE is less than a number of two or more downlink component carriers assigned to the UE.

5. The user equipment according to claim 1, wherein
a number of one or more uplink component carrier(s) and a number of one or more downlink component carrier(s) assigned to each user equipment are asymmetric.

6. The user equipment according to claim 1, wherein
The first component carrier is a component carrier other than a basic component carrier.

7. The user equipment according to claim 6, wherein
the basic component carrier is arbitrarily assigned to each user equipment, and the first basic information size for blind decoding in the first component carrier is independently set for each user equipment.

8. The user equipment according to claim 1, wherein
The first component carrier is a component carrier in which uplink allocation information is absent.

9. The user equipment according to claim 1, wherein
when a number of one or more uplink component carrier(s) assigned to the UE is less than a number of two or more downlink component carriers assigned to the UE,
the control information mapped on the common search space is transmitted only in a portion of the two or more downlink component carriers.

10. The user equipment according to claim 9, wherein
the portion of the two or more downlink component carriers is a basic component carrier.

11. The user equipment according to claim 1, wherein
when a number of one or more uplink component carrier(s) assigned to the UE is less than a number of two or more downlink component carriers assigned to the UE,
uplink allocation information is transmitted only in a portion of the two or more downlink component carriers.

12. The user equipment according to claim 11, wherein
the portion of the two or more downlink component carriers is a basic component carrier.

13. A user equipment, (UE) comprising:
an information size determination section configured to determine a first basic information size of control information mapped on a UE specific search space in a first component carrier, the first basic information size of the control information mapped on the UE specific search space being different from a second basic information size of control information mapped on a common search space in the first component carrier; and
a receiver configured to monitor the control information mapped on the UE specific search space based on the determined first basic information size,
wherein when uplink allocation information is absent in the first component carrier,
the first basic information size is determined according to an information size determined from a downlink bandwidth of the first component carrier.

14. A physical downlink control channel (PDCCH) reception method performed by a reception apparatus, comprising:
determining a first basic information size of control information mapped on a user equipment (UE) specific search space in a first component carrier, the first basic information size of the control information mapped on the UE specific search space being different from a second basic information size of control information mapped on a common search space in the first component carrier; and
monitoring the control information mapped on the UE specific search space based on the determined first basic information size,
wherein when uplink allocation information is absent in the first component carrier, the first basic information size is determined according to an information size determined from a downlink bandwidth of the first component carrier.

15. A physical downlink control channel (PDCCH) reception method performed by a reception apparatus, comprising:
determining a first basic information size of control information mapped on a UE specific search space in a first component carrier; and
monitoring the control information mapped on the UE specific search space based on the determined first basic information size,
wherein a first determination method for determining the first basic information size is different from a second determination method for determining a second basic information size of control information mapped on a common search space in the first component carrier, and
the first determination method for determining the first basic information size is different from a third determination method for determining a third basic information size of control information mapped on a search space in a second component carrier that is different from the first component carrier.

* * * * *

UNITED STATES PATENT AND TRADEMARK OFFICE
CERTIFICATE OF CORRECTION

PATENT NO. : 8,620,338 B2  
APPLICATION NO. : 13/130273  
DATED : December 31, 2013  
INVENTOR(S) : Seigo Nakao et al.

It is certified that error appears in the above-identified patent and that said Letters Patent is hereby corrected as shown below:

In the Claims

Column 25, Line 10, Claim 6
"The first component carrier is a component carrier other" should read, --the first component carrier is a component carrier other--.

Column 25, Line 18, Claim 8
"The first component carrier is a component carrier other" should read, --the first component carrier is a component carrier other--.

Signed and Sealed this  
Fifteenth Day of April, 2014

Michelle K. Lee  
*Deputy Director of the United States Patent and Trademark Office*